United States Patent [19]
Suzuki et al.

[11] Patent Number: 5,908,683
[45] Date of Patent: Jun. 1, 1999

[54] MAGNETIC RECORDING MEDIUM

[75] Inventors: Masaki Suzuki; Hiroo Inaba; Satoshi Matsubaguchi; Hiroaki Takano, all of Kanagawa-ken, Japan

[73] Assignee: Fuji Photo Film Co., Ltd., Japan

[21] Appl. No.: 08/844,388

[22] Filed: Apr. 18, 1997

[30]    Foreign Application Priority Data

Apr. 19, 1996 [JP] Japan ................................. 8-098864

[51] Int. Cl.$^6$ ...................................... G11B 5/708
[52] U.S. Cl. ...................... 428/141; 428/328; 428/329; 428/336; 428/694 BS; 428/694 BB; 428/900
[58] Field of Search ................................. 428/141, 328, 428/329, 336, 694 BS, 694 BB, 900

[56]    References Cited

U.S. PATENT DOCUMENTS 5,219,670   6/1993   Ohno et al. ........................ 428/694
5,540,975   7/1996   Masaki et al. ...................... 428/141

*Primary Examiner*—Stevan A. Resan
*Attorney, Agent, or Firm*—Brinks Hofer Gilson & Lione

[57]    ABSTRACT

A magnetic recording medium comprises a non-magnetic substrate, a lower coating layer, which is overlaid upon the non-magnetic substrate and primarily contains a binder and inorganic particles dispersed in the binder, and a magnetic layer, which is overlaid upon the lower coating layer and is constituted of at least a single layer. The magnetic layer contains at least a binder and ferromagnetic metal particles dispersed in the binder. The thickness of the magnetic layer falls within the range of 0.05 μm to 0.5 μm. The surface roughness of a top magnetic layer is at most 3 nm. The lower coating layer contains a fatty acid. An increase in the number of small protrusions, which have a height of at least 30 nm, does not occur substantially on the surface of the magnetic layer after the magnetic recording medium has been stored for seven days under environmental conditions of a temperature of 60° C. and a relative humidity of 90%.

44 Claims, No Drawings

MAGNETIC RECORDING MEDIUM

BACKGROUND OF THE INVENTION

1. Field of the Invention

This invention relates to a magnetic recording medium. This invention particularly relates to a magnetic recording medium for use in recording a digital signal at high densities and reproducing the recorded digital signal. This invention more particularly relates to a coated type of magnetic recording medium having good storage stability.

2. Description of the Prior Art

Magnetic recording media have heretofore been used widely as sound recording tapes, video tapes, computer tapes, floppy disks, hard disks, and the like. Nowadays, there is a strong demand for the recording of magnetic information at high densities, and the recording wavelength is set to be short. Also, various recording systems, including the analog system and the digital system, have heretofore been studied.

In order to satisfy the demand for the recording of magnetic information at high densities, it has heretofore been studied to utilize thin metal film types of magnetic recording media, in which a thin metal film is employed as the magnetic layer. However, from the view point of productivity and reliability in practical use, such as corrosion resistance, it is advantageous to use coated types of magnetic recording media. The coated types of magnetic recording media comprise a substrate and a magnetic layer coated on the substrate, the magnetic layer comprising a binder and ferromagnetic particles dispersed in the binder.

The packing density of the magnetic material in the magnetic layer of the coated types of magnetic recording media is lower than the packing density in the magnetic layer of the thin metal film types of magnetic recording media. Therefore, the electromagnetic characteristics of the coated types of magnetic recording media were lower than those of the thin metal film types of magnetic recording media. However, recently, with the improvements made in ferromagnetic particles, coated types of magnetic recording media having excellent characteristics have been proposed.

In order to enhance the electromagnetic characteristics of the coated types of magnetic recording media, it is efficient, for example, to improve the magnetic characteristics of the ferromagnetic particles and to smooth the surface of the magnetic layer. In particular, as a technique for achieving the smoothing of the magnetic layer, a wet-on-wet coating technique has been used in practice. The wet-on-wet coating technique enables the enhancement of dispersibility of the magnetic particles and the formation of a very thin, smooth magnetic layer via a non-magnetic layer.

Also, with the rapid advances made in recording media in recent years, there has arisen a tendency toward long-term storage of enormous amounts of image signals and other kinds of signals. From the view point of capability of long-term signal storage, among the recording media, magnetic recording media are more advantageous than the other kinds of recording media. By the investigation of a change in magnetic characteristics and a change in input-output characteristics during long-term storage, it has been confirmed that magnetic recording media have good storage stability.

However, magnetic recording media for recording and reproducing video signals have advanced from 2-inch tapes to 1-inch tapes, to 0.5-inch tapes, and to 8 mm tapes, and the recording density has thus been set to be high. Also, the surface roughness of the magnetic layers of the magnetic recording media for recording and reproducing video signals has been set to be high. With respect to the surface roughness, it has been confirmed that the coated types of magnetic recording media have a certain level of reliability, including runnability, after long-term storage or storage under severe environmental conditions, and the coated types of magnetic recording media have the confidence of the users. However, as the coated types of magnetic recording media have been put into competition with vacuum deposited, thin-layered metal tapes (ME tapes), it has become necessary to solve the problems in that, in cases where the value representing the surface roughness of the magnetic layers of the coated types of magnetic recording media is at most 3 nm, the runnability of the coated types of magnetic recording media become low after long-term storage.

Heretofore, in order for the aforesaid problems to be eliminated, alkali and alkaline earth metals constituents have been removed as much as possible from the magnetic layer such that the formation of fatty acid Na salts and fatty acid Ca salts during the storage under environmental conditions of a temperature of 60° C. and a relative humidity of 90% may be restricted. In particular, if the fatty acid Ca salts are formed in the magnetic layer, they will come out on the surface of the magnetic layer to form elevated protrusions. As a result, space loss between the magnetic recording medium and magnetic head will occur, which will result reduction of output signals. Therefore, the alkali and alkaline earth metals constituents are eliminated from the magnetic layer, and the formation of the fatty acid Ca salts is thereby restricted. However, the problems occur in that the other fatty acid metal salts, such as fatty acid Fe salts, are formed in the magnetic layer and come out to the surface of the magnetic layer, and therefore an increase in the kinetic friction coefficient of the surface of the magnetic layer still occurs after the storage under environmental conditions of a temperature of 60° C. and a relative humidity of 90%. As for the problems with respect to the increase in the kinetic friction coefficient, no improvement has yet been made. It has been found that, in cases where the surface roughness of the magnetic layer is at most 3 nm, the increase in the kinetic friction coefficient of the surface of the magnetic layer after the storage occurs markedly.

SUMMARY OF THE INVENTION

The primary object of the present invention is to provide a magnetic recording medium, on which magnetic information is capable of being recorded at high densities and which has good electromagnetic characteristics.

Another object of the present invention is to provide a coated type of magnetic recording medium, on which magnetic information is capable of being recorded at high densities, and which has good characteristics and undergoes little change in tape runnability after long-term storage and storage under severe environmental conditions of high temperatures and high humidities.

The present invention provides a magnetic recording medium, comprising:

i) a flexible substrate, ii) a lower coating layer, which is overlaid upon the substrate and primarily contains a binder and inorganic particles dispersed in the binder, and iii) a magnetic layer, which is overlaid upon the lower coating layer and is constituted of at least one layer, the magnetic layer comprising a binder and ferromagnetic metal particles dispersed in the binder, wherein the thickness of the magnetic layer falls within the range of 0.05 μm to 0.5 μm, the surface roughness of the magnetic layer is at most 3 nm, the lower coating layer contains a fatty acid, and an increase in the number of small protrusions, which have a height of at least 30 nm, on the surface of the magnetic layer does not occur substantially after the magnetic recording medium has been stored for seven days under environmental conditions of a temperature of 60° C. and a relative humidity of 90%.

The term "surface roughness" as used herein means the surface roughness Ra, expressed in terms of arithmetic mean deviation, which is determined with a light interference method. Also, the term "small protrusions" as used herein means the small protrusions detected with an interatomic force microscope (AFM).

The present invention also provides a magnetic recording medium, comprising:

i) a flexible substrate, ii) a lower coating layer, which is overlaid upon the substrate and primarily contains a binder and inorganic particles dispersed in the binder, and iii) a magnetic layer, which is overlaid upon the lower coating layer and is constituted of at least one layer, the magnetic layer comprising a binder and ferromagnetic metal particles dispersed in the binder, wherein the thickness of the magnetic layer falls within the range of 0.05 μ to 0.5 μ, the surface roughness of a top magnetic layer is at most 3 nm, the lower coating layer contains a fatty acid, and a change in a kinetic friction coefficient of the surface of the magnetic layer before the magnetic recording medium is stored for seven days under environmental conditions of a temperature of 60° C. and a relative humidity of 90% and after the magnetic recording medium has been stored for seven days under environmental conditions of a temperature of 60° C. and a relative humidity of 90% is at most ±10% based on the kinetic friction coefficient of the former magnetic recording medium.

In a preferred aspect of the invention, the inorganic particles contained in the lower coating layer are acicular or spindle-shaped $\alpha$-$Fe_2O_3$ particles, which have an average size of longer axis length falling within the range of 0.05 μm to 0.3 μm and aspect ratio in a range of 2 to 20, or spherical titanium oxide particles, which have a specific surface area falling within the range of 50 $m^2/g$ to 80 $m^2/g$. In cases where the inorganic particles contained in the lower coating layer is constituted of $\alpha$-$Fe_2O_3$ particles, the surfaces of the $\alpha$-$Fe_2O_3$ inorganic particles may contain $SiO_2$ in a proportion falling within the range of 1.0% by weight to 2% by weight, $Al_2O_3$ in a proportion falling within the range of 1.0% by weight to 4% by weight, and P in a proportion of at most 50 ppm. The pH value of $\alpha$-$Fe_2O_3$ particle should preferably fall within the range of 7 to 11. In cases where the inorganic particles contained in the lower coating layer is constituted of titanium oxide particles, the surfaces of the titanium oxide inorganic particles may contain $Al_2O_3$ in a proportion falling within the range of 6% by weight to 10% by weight. The pH value of the titanium oxide particles should preferably fall within the range of 7 to 10.

The term "small protrusions" as used herein means the small protrusions having a height of at least 30 nm and occurring on the surface of the magnetic layer. If the magnetic recording medium has bad storage stability, the number of the small protrusions will increase markedly during the long-term storage. The inventors found that the increase in the number of the small protrusions affects the storage stability. The present invention defines the coated type of magnetic recording medium having good storage stability by limiting the degree of increase in the number of the small protrusions.

Also, the present invention defines the coated type of magnetic recording medium having good storage stability by limiting the extent of the change in the kinetic friction coefficient of the surface of the magnetic layer before and after the storage.

The magnetic recording medium in accordance with the present invention comprises a flexible substrate, a lower coating layer, which is overlaid upon the substrate and primarily contains a binder and inorganic particles dispersed in the binder, and a magnetic layer, which is overlaid upon the lower coating layer and is constituted of at least one layer, the magnetic layer containing a binder and ferromagnetic metal particles dispersed in the binder. The thickness of the magnetic layer falls within the range of 0.05 μm to 0.5 μm, surface roughness of a top surface of the magnetic layer is at most 3 nm, and the lower coating layer contains a fatty acid. With the constitution of the magnetic recording medium in accordance with the present invention, the increase in the number of small protrusions, which have a height of at least 30 nm, does not occur substantially on the surface of the magnetic layer after the magnetic recording medium has been stored for seven days under environmental conditions of a temperature of 60°0 C. and a relative humidity of 90%. Also, with the constitution of the magnetic recording medium in accordance with the present invention, the change in the kinetic friction coefficient of the surface of the magnetic layer before the magnetic recording medium is stored for seven days under environmental conditions of a temperature of 60° C. and a relative humidity of 90% and after the magnetic recording medium has been stored for seven days under environmental conditions of a temperature of 60° C. and a relative humidity of 90% is at most ±10% based on the kinetic friction coefficient of the former one. The magnetic recording medium in accordance with the present invention undergoes little change in tape runnability during long-term storage and storage under severe environmental conditions of high temperatures and high humidities. Therefore, the coated type of magnetic recording medium, on which magnetic information is capable of being recorded at high densities and which has good characteristics, can be obtained.

DETAILED DESCRIPTION OF THE INVENTION

The magnetic recording medium in accordance with the present invention will hereinbelow be described in detail.

In digital VCRs for consumer use, a signal of a recording wavelength of 22 μ is employed as a synchronizing signal, and a recording wavelength of 0.488 μ is employed for an information signal. Also, in order for the weight of the device to be kept light, an erasing head is omitted, and an overwrite erasing technique is employed. In order for the overwrite erasing technique to be employed, it is necessary to erase the synchronizing signal by the information signal. It has been theorized that the overwrite erasing rate should preferably be at most −20 dB. As the characteristics which the recording media should have, it is desired that the overwrite erasing rate can be kept to be as low as possible. The overwrite characteristics can be enhanced by reducing the thickness of the magnetic layer. However, if the thickness of the magnetic layer is merely reduced, the total amount of magnetization will become small, and therefore the reproduction output with a long-wavelength signal as in the synchronizing signal will become low. In order for the long-wavelength signal output to be enhanced, a large amount of magnetization is necessary. For such purposes, a high magnetic flux density and a certain level of thickness must be ensured.

As described above, the overwrite characteristics and the long-wavelength signal output are incompatible with each other. However, besides the reduction in the thickness of the magnetic layer, the overwrite erasing rate can be kept low by recording a short-wavelength signal as in the information signal up to a deep position in the magnetic layer. For such purposes, it is efficient to apply as large a recording current as possible when the information signal is recorded. For the compatibility with ME tapes, it is desirable that the optimum recording current be as large as the optimum recording current for the ME tapes. Also from the view point of the overwrite characteristics, it is desirable that as large a recording current as possible be applied.

Besides the factors described above, in order for the overwrite characteristics to be enhanced, it is desirable that the surface of the magnetic layer be rendered as smooth as possible within the range which runnability permit. Also, it has been found that, as the squareness ratio of the magnetic layer becomes high, and as the SFD becomes low, the overwrite characteristics become good.

In view of the effect mechanisms described above, the inventors carried out extensive research and found that a digital video tape capable of being used in digital VCRs for consumer use can be obtained from a magnetic recording medium comprising a flexible substrate, a lower coating layer, which is overlaid upon the substrate and primarily contains a binder and inorganic particles dispersed in the binder, and a magnetic layer, which is overlaid upon the lower coating layer and is constituted of at least one layer, the magnetic layer comprising a binder and ferromagnetic metal particles dispersed in the binder, wherein the thickness of the magnetic layer falls within the range of 0.05 $\mu$ to 0.5 $\mu$ (and should preferably fall within the range of 0.07 $\mu$ to 0.2 $\mu$), wherein the maximum magnetic flux density Bm of the magnetic layer, as measured under an external magnetic field of 10 kOe, falls within the range of 3,700 gauss to 6,000 gauss, and wherein the coercive force Hc of the magnetic layer falls within the range of 2,000 Oe to 3,000 Oe.

The lower coating layer will hereinbelow be described in detail.

The inorganic particles employed in the lower coating layer may be magnetic particles or non-magnetic particles with non-magnetic particles preferred. For example, in cases where the inorganic particles are the non-magnetic particles, the non-magnetic particles may be constituted of inorganic compounds selected from the group consisting of metal oxides, metal carbonates, metal sulfates, metal nitrides, metal carbides, and metal sulfides. Examples of the inorganic compounds include α-alumina having a degree of alphatization of at least 90%, β-alumina, γ-alumina, θ-alumina, silicon carbide, chromium oxide, cerium oxide, α-iron oxide, goethite, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, and molybdenum disulfide. The above-enumerated inorganic compounds may be used alone, or two or more of them may be used in combination. In particular, titanium dioxide, zinc oxide, iron oxide, and barium sulfate are preferable. Titanium dioxide and α-iron oxide are more preferable. The particle size of the non-magnetic inorganic particles should preferably fall within the range of 0.005 $\mu$m to 2 $\mu$m. When necessary, non-magnetic inorganic particles having a certain particle size and non-magnetic inorganic particles having a different particle size maybe used in combination. Alternatively, in cases where non-magnetic inorganic particles having a certain particle size are employed, the particle diameter distribution of the non-magnetic inorganic particles may be set to be wide, and the same effects as those obtained by combining the non-magnetic inorganic particles having different particle sizes may thereby be obtained. The particle size of the non-magnetic inorganic particles should more preferably fall within the range of 0.1 $\mu$m to 0.2 $\mu$m. The tap density of the non-magnetic inorganic particles may fall within the range of 0.05 g/ml to 2 g/ml, and should preferably fall within the range of 0.2 g/ml to 1.5 g/ml. The water content of the non-magnetic inorganic particles may fall within the range of 0.1% by weight to 5% by weight, should preferably fall within the range of 0.2% by weight to 3% by weight, and should more preferably fall within the range of 0.3% by weight to 1.5% by weight. The pH value of the non-magnetic inorganic particles generally fall within the range of 2 to 11, but those having a pH value in the range of 7 to 11 should be used in this invention. The specific surface area of the non-magnetic inorganic particles may fall within the range of 1 m$^2$/g to 100 m$^2$/g, should preferably fall within the range of 30 m$^2$/g to 80 m$^2$/g, and should more preferably fall within the range of 50 m$^2$/g to 80 m$^2$/g. The crystallite size of acicular or spindle-shaped α-Fe$_2$O$_3$ as the non-magnetic inorganic particles should preferably fall within the range of 0.004 $\mu$m to 1 $\mu$m, and should more preferably fall within the range of 0.075 $\mu$m to 0.2 $\mu$m. The oil absorption amount, as measured with dibutyl phthalate (DBP), of the non-magnetic inorganic particles may fall within the range of 5 ml/100 g to 100 ml/100 g, should preferably fall within the range of 10 ml/100 g to 80 ml/100 g, and should more preferably fall within the range of 20 ml/100 g to 60 ml/100 g. The specific gravity of the non-magnetic inorganic particles may fall within the range of 1 to 12, and should preferably fall within the range of 3 to 6. The non-magnetic inorganic particles may have an acicular shape, a spherical shape, a polyhedral shape, or a plate-like shape.

The ignition loss of the non-magnetic inorganic particles should preferably be at most 20% by weight, and should more preferably be zero. The Mohs hardness of the non-magnetic inorganic particles should preferably fall within the range of 4 to 12. The roughness factor of the surface of the non-magnetic inorganic particles should preferably fall within the range of 0.8 to 1.5, and should more preferably fall within the range of 0.9 to 1.2. The stearic acid (SA) adsorption amount of the non-magnetic inorganic particles should preferably fall within the range of 1 $\mu$mol/m$^2$ to 20 $\mu$mol/m$^2$, and should more preferably fall within the range of 2 $\mu$mol/m$^2$ to 15 $\mu$mol/m2. The heat of wetting of the non-magnetic inorganic particles with water at 25° C. should preferably fall within the range of 200 erg/cm$^2$ to 600 erg/cm$^2$. Solvents yielding the heat of wetting falling within this range may be utilized. The number of water molecules on the particle surface at a temperature of 100° C. to 400° C. should preferably fall within the range of 1 to 10 molecules/100 A. The pH value at the isoelectric point in water should preferably fall within the range of 7 to 9.

The surfaces of the non-magnetic inorganic particles should preferably be coated with at least one compound selected from the group consisting of Al$_2$O$_3$, SiO$_2$, TiO$_2$, ZrO$_2$, SnO$_2$, Sb$_2$O$_3$, ZnO, and phosphoric acid salts. From the point of view of the dispersibility, $Al_2O_3$, $SiO_2$, $TiO_2$, and $ZrO_2$ are preferable, among which $Al_2O_3$, $SiO_2$, and $ZrO_2$ are more preferable. The above-enumerated compound for coating the non-magnetic inorganic particles may be used alone, or two or more of them may be used in combination. Also, a co-precipitated surface coating for the non-magnetic inorganic particles may be employed in accordance with the characteristics of the non-magnetic inorganic particles which are to be obtained. Alternatively, the surfaces may firstly be treated to form a coating of alumina, and thereafter to form a coating of silica or vice versa, thereby obtaining coated non-magnetic inorganic particles. Further, the surface treatment layer maybe set to be porous in accordance with the characteristics of the non-magnetic inorganic particles which are to be obtained. However, ordinarily, the surface treatment layer should preferably be homogeneous and dense.

A part of these coated non-magnetic inorganic particles and a preparing method therefor are described in U.S. Pat. Nos. 5,587,232 and 5,604,015.

Examples of the non-magnetic inorganic particles employed in the lower coating layer of the magnetic recording medium in accordance with the present invention include Nanotite supplied by Showa Denko K.K.; HIT-100 and ZA-Gl, which are supplied by Sumitomo Chemical Co., Ltd.; DPN-250, DPN-250BX, DPN-245, DPN-270BX, DPN-550BX, and DPN-550RX, which are supplied by Toda Kogyo Corp.; Titanium Oxide TTO-51B, TTO-55A, TTO-55B, TTO-55C, TTO-55S, TTO-55D, SN-100, α-Iron Oxide E270, E271, and E300, which are supplied by Ishihara Sangyo Kaisha, Ltd.; STT-4D, STT-30D, STT-30, and STT-65C, which are supplied by Titan Kogyo K.K.; MT-100S, MT-100T, MT-150W, MT-500B, MT-600B, MT-100F, and MT-500HD, which are supplied by Teika Co.; FINEX-25, BF-1, BF-10, BF-20, and ST-M, which are supplied by Sakai Chemical Industry Corp.; DEFIC-Y and DEFIC-R, which are supplied by Dowa Mining Co., Ltd.; AS2BM and $TiO_2P25$, which are supplied by Nippon Aerosil Corp.; 100A and 500A, which are supplied by Ube Industries, Ltd.; Y-LOP supplied by Titan Kogyo K.K.; and products obtained by firing the above-enumerated non-magnetic inorganic particles.

Among the above-enumerated non-magnetic inorganic particles, titanium dioxide and α-iron oxide are particularly preferable and α-iron oxide is most preferable.

Particles of α-iron oxide are acicular or spindle-shaped particles. The average size of the longer axis length of the α-iron oxide particles should preferably fall within the range of 0.05 μm to 0.3 μm, and should more preferably fall within the range of 0.06 μm to 0.15 μm. The aspect ratio of the a-iron oxide particles should preferably fall within the range of 2 to 20, and should more preferably fall within the range of 3 to 10. The pH value of the α-iron oxide particles should preferably fall within the range of 7 to 11, should more preferably fall within the range of 8 to 11, and should most preferably fall within the range of 9 to 10.

In cases where the a-iron oxide particles having a pH value falling within the range of 7 to 11 are employed, the number of small protrusions occurring on the surface of the magnetic layer after the storage at high temperatures and high humidities can be prevented from increasing, and the change in kinetic friction coefficient after the storage at high temperatures and high humidities can be kept small. The α-iron oxide particles having a pH value falling within the range of 7 to 11 can be obtained with a known technique, such as a technique for adjusting the pH value in a process for neutralizing an alkali, e.g. sodium hydroxide or sodium carbonate, which is used in the preparation of α-iron oxide, or a technique for adjusting the extent of washing in a process for washing the alkali with water, or the like. Also, at least a portion of the surfaces of the α-iron oxide particles should preferably be coated with at least one compound selected from the group consisting of $Al_2O_3$, $SiO_2$, and $ZrO_2$. In such cases, the increase in number of small protrusions occurring on the surface of the magnetic layer after the storage at high temperatures and high humidities can be restricted more efficiently, and the change in kinetic friction coefficient after the storage at high temperatures and high humidities can be reduced more efficiently. Further, the surfaces of the α-iron oxide particles, which have a pH value falling within the range of 7 to 11 and have been coated with the specific compound described above, may be coated with an organic compound having an acid group derived from an oxygen acid of phosphorus, such as phenylphosphonic acid (e.g., one of the compounds represented by general formulas (1), (2), and (3) described in U.S. Pat. No. 5,318,838). In such cases, the increase in number of small protrusions occurring on the surface of the magnetic layer after the storage at high temperatures and high humidities can be restricted even further, and the change in kinetic friction coefficient after the storage at high temperatures and high humidities can be reduced even further. The proportion of $Al_2O_3$ should particularly preferably fall within the range of 1% by weight to 4% by weight with respect to the weight of α-iron oxide. The proportion of $SiO_2$ should particularly preferably fall within the range of 1% by weight to 4% by weight with respect to the weight of α-iron oxide. The proportion of P should particularly preferably be at most 50 ppm with respect to the weight of α-iron oxide.

Particles of titanium oxide are spherical particles. The titanium oxide particles should preferably have a specific surface area falling within the range of 50 $m^2/g$ to 80 $m^2/g$ and a pH value falling within the range of 8 to 11. In cases where such titanium oxide particles are employed, the number of small protrusions occurring on the surface of the magnetic layer after the storage at high temperatures and high humidities can be prevented from increasing, and the change in kinetic friction coefficient after the storage at high temperatures and high humidities can be kept small. The particle diameter of the titanium oxide particles should preferably fall within the range of 0.01 μm to 0.1 μm. At least a portion of the surfaces of the titanium oxide particles should preferably be coated with $Al_2O_3$.

The lower coating layer contains a fatty acid as a lubricating agent. The fatty acid migrates little by little to the surface of the magnetic layer and imparts a predetermined kinetic friction coefficient to the magnetic layer.

As the fatty acid, saturated or unsaturated, monobasic fatty acids having 12 to 24 carbon atoms are preferable. Examples of preferable fatty acids include lauric acid, myristic acid, palmitic acid, stearic acid, behenic acid, oleic acid, linolic acid, linolenic acid, and elaidic acid. Among the above-enumerated fatty acids, lauric acid, myristic acid, palmitic acid, stearic acid, behenic acid, and oleic acid are particularly preferable.

The proportion of the fatty acid contained in the lower coating layer should preferably fall within the range of 0.3% by weight to 3% by weight with respect to the non-magnetic inorganic particles, and should more preferably fall within the range of 0.6% by weight to 2% by weight with respect to the non-magnetic inorganic particles.

In cases where carbon black is contained in the lower coating layer, as is already known, the electrical surface resistance Rs can be reduced, and the light transmittance can be kept small. Also, a desired micro Vickers hardness can be obtained. As the carbon black, furnace black for rubber, thermal black for rubber, coloring black, acetylene black, or the like, may be used.

The specific surface area of the carbon black may fall within the range of 100 m$^2$/g to 500 m$^2$/g, and should preferably fall within the range of 150 m$^2$/g to 400 m$^2$/g. The dibutyl phthalate (DBP) oil absorption of the carbon black may fall within the range of 20 ml/100 g to 400 ml/100 g, and should preferably fall within the range of 30 ml/100 g to 200 ml/100 g. The particle diameter of the carbon black may fall within the range of 5 m$\mu$ to 80 m$\mu$, should preferably fall within the range of 10 m$\mu$ to 50 m$\mu$, and should more preferably fall within the range of 10 m$\mu$ to 40 m$\mu$. The carbon black should preferably have a pH value falling within the range of 2 to 10, a water content falling within the range of 0.1% to 10%, and a tap density falling within the range of 0.1 g/ml to 1 g/ml. Examples of the carbon black capable of being used in the lower coating layer of the magnetic recording medium in accordance with the present invention include Blackpearls 2000, 1300, 1000, 900, 800, 880, 700, and Vulcan XC-72, which are supplied by Cabot Co.; #3050B, 3150B, 3250B, #3750B, #3950B, #950, #650B, #970B, #850B, and MA-600, which are supplied by Mitsubishi Chemical Industries Ltd.; Conductex SC, Raven8800, 8000, 7000, 5750, 5250, 3500, 2100, 2000, 1800, 1500, 1255, and 1250, which are supplied by Columbian Carbon Co.; and Ketjen Black EC supplied by Ketjen Black International Company. The carbon black may be subjected to surface treatment with a dispersing agent, or the like, or may be grafted with a resin. It is also possible to employ a carbon black having been treated such that a portion of the carbon black surface may be graphitized Further, before being added to a coating material, the carbon black may be dispersed in a binder. The proportion of the carbon black may be at most 50% by weight with respect to the non-magnetic inorganic particles described above and may be at most 40% with respect to the total weight of the non-magnetic layer. The carbon black materials described above may be used alone, or two or more of them may be used in combination.

As for the carbon black which may be employed in the magnetic recording medium in accordance with the present invention, reference may be made to, for example, "Carbon Black Handbook," published by Carbon Black Society.

Also, organic particles may be added to the lower coating layer in accordance with the characteristics of the lower coating layer which is to be obtained. Examples of the materials of the organic particles include an acryl styrene resin, a benzoguanamine resin, a melamine resin, and a phthalocyanine pigment. It is also possible to employ particles of a polyolefin resin, a polyester resin, a polyamide resin, a polyimide resin, or a polyfluoroethylene resin. The above-enumerated organic particles may be produced with one of methods described in, for example, Japanese Unexamined Patent Publication Nos. 60(1985)-255827 and 62(1987)-18564.

A prime-coating layer is formed in ordinary magnetic recording media. The prime-coating layer serves to enhance the adhesion between the substrate and the magnetic layer. The prime-coating layer comprises a solvent-soluble polyester such as STAFIX supplied by Fuji Photo Film Co., Ltd. and VYLON #300 supplied by Toyobo Co., Ltd. Ordinarily, the thickness of the prime-coating layer is set to be at most 0.5 $\mu$m.

As for the binders, lubricating agents, dispersing agents, additives, solvents, dispersing methods, and other techniques, which may be employed for the lower coating layer, those ordinarily utilized for magnetic layers may be utilized. In particular, as for the proportions and kinds of the binders, additives, and dispersing agents, the techniques already known for magnetic layers may be employed.

The magnetic layer, which is overlaid upon the lower coating layer, will hereinbelow be described in detail.

As the ferromagnetic particles, which are employed in the magnetic layer, it is possible to employ any of already known ferromagnetic particles, such as the particles of $\gamma$-FeO$_x$ (where x=1.33 to 1.5), Co-modified $\gamma$-FeO$_x$ (where x=1.33 to 1.5), a ferromagnetic alloy containing $\alpha$-Fe, Ni, or Co as the main constituent (in proportions of at least 75%), barium ferrite, or strontium ferrite. Among the above-enumerated ferromagnetic particles, the particles of the ferromagnetic alloy containing $\alpha$-Fe as the main constituent are preferable. Besides the predetermined atoms, the ferromagnetic particles may also contain Al, Si, S, Sc, Ca, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, and B atoms. Particularly, in the cases of metal magnetic materials, Al, Si, Ca, Y, Ba, La, Nd, Co, Ni, and B are important as the elements contained besides $\alpha$-Fe. Before being subjected to the dispersing step, the ferromagnetic particles may be treated with dispersing agents, lubricating agents, surface-active agents, antistatic agents, or the like, which will be described later. Specifically, various ferromagnetic particles are described in, for example, Japanese Patent Publication Nos. 44(1969)-14090, 45(1970)-18372, 47(1972)-22062, 47(1972)-22513, 46(1971)-28466, 46(1971)-38755, 47(1972)-4286, 47(1972)-12422, 47(1972)-17284, 47(1972)-18509, 47(1972)-18573, 39(1964)-10307, 48(1973)-39639, and U.S. Pat. Nos. 3,026,215, 3,031,341, 3,100,194, 3,242,005,and3,389,014.

Among the above-enumerated ferromagnetic particles, the ferromagnetic alloy particles may contain small amounts of hydroxides or oxides. The ferromagnetic alloy particles produced in accordance with any of conventional producing techniques may be employed. Examples of the conventional techniques for producing the ferromagnetic alloy particles include the following:

(a) A technique for reducing a composite organic acid salt (mainly, oxalic acid salt) with a reducing gas, such as hydrogen gas.

(b) A technique for reducing iron oxide with a reducing gas, such as hydrogen gas, and thereby obtaining Fe particles or Fe-Co particles.

(c) A technique for thermally decomposing a metal carbonyl compound.

(d) A technique for adding a reducing agent, such as sodium boron hydride, hypophosphite, or hydrazine, to an aqueous solution of a salt of a ferromagnetic metal, and reducing the salt of the ferromagnetic metal.

(e) A technique for evaporating a metal in an inert gas at a low pressure, and thereby obtaining fine metal particles.

The ferromagnetic alloy particles having been obtained in the manner described above may be subjected to known gradual oxidation treatment. Specifically, the ferromagnetic alloy particles may be dipped in an organic solvent and then dried. Alternatively, the ferromagnetic alloy particles may be dipped in an organic solvent, an oxygen-containing gas may then be passed over the particles, oxide films may thereby be formed on the particle surfaces, and the particles may then be dried. As another alternative, instead of an organic solvent being used, oxide films may be formed on the particle surfaces by adjusting the partial pressures of an oxygen gas and an inert gas.

The specific surface area, as measured with the BET method, of the ferromagnetic particles, which are contained in the magnetic layer of the magnetic recording medium in accordance with the present invention, may fall within the range of 45 m$^2$/g to 80 m$^2$/g, and should preferably fall within the range of 50 m$^2$/g to 70 m$^2$/g. If the specific surface area of the ferromagnetic particles is less than 45 m$^2$/g, noise cannot be kept low. If the specific surface area of the ferromagnetic particles is more than 80 m2/g, good surface smoothness cannot be obtained. The crystallite size of the ferromagnetic particles, which are contained in the magnetic layer, may fall within the range of 80 A (angstrom) to 350 A, should preferably fall within the range of 100 A to 250 A, and should more preferably fall within the range of 140 A to 200 A.

The value of saturation magnetization σS of the ferromagnetic particles should preferably fall within the range of 100 emu/g to 180 emu/g, should more preferably fall within the range of 110 emu/g to 170 emu/g, and should most preferably fall within the range of 125 emu/g to 160 emu/g. The coercive force Hc of the ferromagnetic particles should preferably fall within the range of 1,500 Oe to 3,000 Oe, and should more preferably fall within the range of 1,800 Oe to 2,700 Oe. The acicular ratio of the ferromagnetic particles should preferably fall within the range of 3 to 10, and should more preferably fall within the range of 3 to 8. The water content of the ferromagnetic particles should preferably fall within the range of 0.01% to 2%. The water content of the ferromagnetic particles should preferably be adjusted appropriately in accordance with the kind of the binder used.

The pH value of the ferromagnetic particles should preferably adjusted appropriately in accordance with the combination with the binder used. The pH value of the ferromagnetic particles may fall within the range of 4 to 12, and should preferably fall within the range of 6 to 10. When necessary, the ferromagnetic particles may be subjected to surface treatment using a surface treatment agent, such as Al, Si, P, or one of oxides of them. The proportion of the surface treatment agent may fall within the range of 0.1% to 10%. In cases where surface treatment is carried out, the rate of adsorption of a lubricating agent, such as a fatty acid, can be kept to be at most 100 mg/m$^2$. It often occurs that the ferromagnetic particles contain a soluble inorganic ion, such as Na, Ca, Fe, Ni, or Sr. If the content of the soluble inorganic ion is at most 200 ppm, adverse effects will not particularly occur on the initial characteristics of the ferromagnetic particles. However, from the view point of the change with the passage of time during the storage of the magnetic recording medium, the content of the soluble inorganic ion should preferably be at most 10 ppm.

The amount of pores of the ferromagnetic particles should preferably be as small as possible. Specifically, the amount of pores of the ferromagnetic particles should preferably be at most 20% by volume, and should preferably be at most 5% by volume. The ferromagnetic particles may have an acicular shape, a granular shape, a rice grain-like shape, or a plate-like shape, which satisfies the aforesaid characteristics with respect to the particle size. As for the acicular ferromagnetic particles, the acicular ratio should preferably fall within the range of 4 to 12. Such that the SFD of the ferromagnetic particles may be at most 0.6, it is necessary for the distribution of the coercive force Hc of the ferromagnetic particles to be kept narrow. For such purposes, for example, the particle size distribution of goethite may be kept good, or the sintering of γ-hematite may be prevented.

As the binders for the lower coating layer and for the magnetic layer, thermoplastic resins, thermosetting resins, or reactive resins, which are already known, or mixtures of two or more of these resins may be used. The thermoplastic resins may have a glass transition temperature falling within the range of approximately −100° C. to approximately 150° C., a number-average molecular weight falling within the range of approximately 1,000 to approximately 200,000, preferably approximately 10,000 to approximately 100,000, and a polymerization degree falling within the range of approximately 50 to approximately 1,000.

Examples of the thermoplastic resins include polymers or copolymers containing, as the constituent unit, vinyl chloride, vinyl acetate, vinyl alcohol, maleic acid, acrylic acid, an acrylic ester, vinylidene chloride, acrylonitrile, methacrylic acid, a methacrylic ester, styrene, butadiene, ethylene, vinyl butyral, vinyl acetal, or a vinyl ether. Examples of the thermoplastic resins also include polyurethane resins and various kinds of rubber-type resins. Examples of the thermosetting resins or the reactive resins include a phenol resin, an epoxy resin, a polyurethane curable resin, a urea resin, a melamine resin, an alkyd resin, an acrylic reactive resin, formaldehyde resin, a silicone resin, an epoxy-polyamide resin, a mixture of a polyester resin and an isocyanate prepolymer, a mixture of a polyester polyol and a polyisocyanate, and a mixture of a polyurethane and a polyisocyanate. The above-enumerated resins are described in detail in, for example, "Plastic Handbook" published by Asakura Shoten. It is also possible to use a known electron beam-curing resin in the lower coating layer or the magnetic layer.

Examples of the aforesaid resins and methods for producing them are described in detail in, for example, Japanese Unexamined Patent Publication No. 62(1987)-256219. The above-enumerated resins may be used alone, or two or more of them may be used in combination. Examples of preferable binders include a combination of a polyurethane resin and at least a single kind of resin selected from the group consisting of a vinyl chloride resin, a vinyl chloride-vinyl acetate resin, a vinyl chloride-vinyl acetate-vinyl alcohol resin, and a vinyl chloride-vinyl acetate-maleic anhydride copolymer; and a mixture of such a combination and a polyisocyanate. As for the structures of the polyurethane resins, it is possible to employ any of known structures, such as a polyester polyurethane, a polyether polyurethane, a polyether polyester polyurethane, a polycarbonate polyurethane, a polyester polycarbonate polyurethane, a polycaprolactone polyurethane, and a polyolefin polyurethane. When necessary, such that good dispersion properties and good durability may be obtained, at least a single kind of polar group may be introduced into the above-enumerated binders through a copolymerization reaction or an addition reaction. The polar group may be selected from the group consisting of —COOM, —SO$_3$M, —OSO$_3$M, —P=O(OM)$_2$, —O—P=O(OM)$_2$, wherein M represents a hydrogen atom or an alkali metal salt group, —OH, —NR$_2$, —N$^+$R$_3$, wherein R represents a hydrocarbon group, an epoxy group, —SH, —CN, sulfobetaine, phosphobetaine, and carboxybetaine. The proportion of the polar group may fall within the range of 10$^{-1}$ to 10$^{-8}$ mol/g, and should preferably fall within the range of 10$^{-2}$ to 10$^{-6}$ mol/g.

Specifically, examples of the aforesaid binders which may be employed in the magnetic recording medium in accordance with the present invention include VAGH, VYHH, VMCH, VAGF, VAGD, VROH, VYES, VYNC, VMCC, XYHL, XYSG, PKHH, PKHJ, PKHC, and PKFE, which are supplied by Union Carbide Co.; MPR-TA, MPR-TA5, MPR-TAL, MPR-TSN, MPR-TMF, MPR-TS, MPR-TM, and MPR-TAO, which are supplied by Nisshin Kagaku Kogyo K.K.; 1000W, DX80, DX81, DX82, DX83, and 100FD, which are supplied by Denki Kagaku Kogyo K.K.; MR-104, MR-105, MR110, MR100, and 400X-110A, which are supplied by Nippon Zeon Co., Ltd.; Nipporan N2301, N2302, and N2304, which are supplied by Nippon Polyurethane K.K.; Pandex T-5105, T-R3080, T-5201, Burnock D-400, D-210-80, Crisvon 6109, and 7209, which are supplied by Dainippon Ink and Chemicals, Inc.; Vylon UR8200, UR8300, UR-8600, UR-5500, UR-4300, RV530, and RV280, which are supplied by Toyobo Co., Ltd.; Daiphelamin 4020, 5020, 9020, 9022, and 7020, which are supplied by Dainichi Seika Kogyo K.K.; MX5004 supplied by Mitsubishi Kagaku K.K.; Sanprene SP-150, TIM-3003, and TIM-3005, which are supplied by Sanyo Chemical Industries Ltd.; and Saran F310, and F210, which are supplied by Asahi Chemical Industry Co., Ltd. Among the above-enumerated binders, MR-104, MR110, UR8200, UR8300, UR-8600, UR-5500, UR-4300, and TIM-3005 are preferable.

The radius of inertia of urethanes varies for different urethane structures and can be changed by changing the amounts of the urethane group and the ether linkage, which are contained in the urethane skeleton, such that the characteristics of the urethane may not be lost markedly. In the above-enumerated urethanes, the radius of inertia should preferably be set to be large by changing the amounts of the urethane group and the ether linkage. The radius of inertia in a cyclohexanone solution should preferably fall within the range of 5 nm to 50 nm, should more preferably fall within the range of 5 nm to 30 nm, and should most preferably fall within the range of 5 nm to 20 nm. In the polymer chemistry, the spread of a polymer in its solution from its center of gravity is taken as the radius of inertia, and the radius of inertia can be determined with light scattering. The radius of inertia of polymers is described in, for example, "Fundamental Polymer Science" by Masaki Hasegawa and Toshio Nishi. In the present invention, the radius of inertia was measured by dissolving the polyurethane resin in cyclohexanone, thereby preparing 0.2%, 0.4%, 0.6%, and 0.8% dilute solutions, and using Photal-DLS-700 (supplied by Otsuka Denshi K.K).

In general, the glass transition temperature Tg of polyurethane resins markedly affects the formation of the surface of the magnetic layer. If the glass transition temperature Tg of polyurethane resins is high, the calendering characteristics of the magnetic layer cannot be kept good. If the glass transition temperature Tg of polyurethane resins is low, the glass transition temperature Tg of the magnetic layer will become low, and the blocking of the magnetic layer and the backing layer will occur. In the magnetic recording medium in accordance with the present invention, good calendering characteristics can be obtained and the blocking during storage at high temperatures can be prevented by employing a polyurethane resin having a high glass transition temperature Tg in the top layer, employing a polyurethane resin having a glass transition temperature Tg, which is lower than that of the polyurethane resin in the top layer, in the top layer, in the layer formed under the top layer, setting the glass transition temperature Tg of the top magnetic layer to be at least 80° C., and thereby forming the multi-layer constitution.

Proportion of the binder in the magnetic layer may fall within the range of 5% by weight to 25% by weight with respect to the ferromagnetic particles, and should preferably fall within the range of 7% by weight to 24% by weight with respect to the ferromagnetic particles. Also, the proportion of the binder in the lower coating layer may fall within the range of 5% by weight to 25% by weight with respect to the non-magnetic inorganic particles, and should preferably fall within the range of 7% by weight to 24% by weight with respect to the non-magnetic inorganic particles. In cases where a vinyl chloride resin is employed, its proportion may fall within the range of 5% by weight to 30% by weight. In cases where a polyurethane resin is employed, its proportion may fall within the range of 2% by weight to 20% by weight. The proportion of a polyisocyanate may fall within the range of 2% by weight to 20% by weight. A vinyl chloride resin, a polyurethane, and a polyisocyanate should preferably be used in combination. In particular, the layer constitution should preferably be set such that the upper layer may not contain a vinyl chloride resin and may contain a polyurethane resin and a polyisocyanate. The total proportion of the polyurethane resin and the polyisocyanate should preferably fall within the range of 7% by weight to 24% by weight, and should more preferably fall within the range of 7% by weight to 15% by weight.

In cases where a polyurethane is employed, the polyurethane should preferably have a glass transition temperature falling within the range of −50° C. to 100° C., a breaking extension falling within the range of 100% to 2,000%, a breaking stress falling within the range of 0.05 kg/cm to 10 kg/cm, and a yield point falling within the range of 0.05 $kg/cm^2$ to 10 $kg/cm^2$.

The magnetic recording medium in accordance with the present invention comprises at least two layers. Therefore, when necessary, the amount of the binder, the proportion of a vinyl chloride resin, a polyurethane, a polyisocyanate, or the like, in the binder, the molecular weight of each resin, the proportion of a polar group, physical characteristics of each resin, or the like, may be varied among the lower coating layer, an upper magnetic layer, and the other magnetic layers. As for such techniques, any of already known techniques for multi-layer media may be employed. For example, in cases where the amount of the binder is varied among upper and lower layers and an intermediate layer, in order for the scratching of the surface of the magnetic layer to be reduced, it is efficient to increase the amount of the binder contained in the upper magnetic layer. In order for the head touch with respect to the magnetic head to be kept good, the amount of the binder contained in the magnetic layer, which is other than the upper magnetic layer, or the amount of the binder contained in the intermediate layer may be increased, and the layer may thereby be imparted with softness.

Examples of the polyisocyanates include isocyanates, such as tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate, and triphenylmethane triisocyanate. As the polyisocyanates, it is also possible to use the products of reactions of the above-enumerated isocyanates and polyalcohols, and polyisocyanates produced from condensation of isocyanates. Such polyisocyanates are commercially available under the trade names of, for example, Coronate L, Coronate HL, Coronate 2030, Coronate 2031, Myrionate MR, and Myrionate MTL, which are supplied by Nippon Polyurethane K.K.; Takenate D-102, Takenate D-110N, Takenate D-200, and Takenate D-202, which are supplied by Takeda Chemical Industries, Ltd.; and Desmodur L, Desmodur IL, Desmodur N, and Desmodur HL, which are supplied by Sumitomo Bayer K.K.). In each of the lower coating layer and the magnetic layer, these polyisocyanates may be used alone, or a mixture of two or more of them may be used by the utilization of differences in curing reaction properties.

The magnetic layer may also contain carbon black. As the carbon black, furnace black for rubber, thermal black for rubber, coloring black, acetylene black, or the like, may be used. The specific surface area of the carbon black may fall within the range of 5 m²/g to 500 m²/g, and the dibutyl phthalate (DBP) oil absorption of the carbon black may fall within the range of 10 ml/100 g to 400 ml/100 g. The particle diameter of the carbon black may fall within the range of 5 mμ to 300 mμ, and the pH value of the carbon black may fall within the range of 2 to 10. The water content of the carbon black may fall within the range of 0.1% to 10%, and the tap density of the carbon black may fall within the range of 0.1 g/cc to 1 g/cc. Examples of the carbon black capable of being used in the magnetic layer of the magnetic recording medium in accordance with the present invention include Blackpearls 2000, 1300, 1000, 900, 800, 700, and Vulcan XC-72, which are supplied by Cabot Co.; #80, #60, #55, #50, and #35, which are supplied by Asahi Carbon K.K.; #2400B, #2300, #900, #1000, #30, #40, and #10B, which are supplied by Mitsubishi Chemical Industries Ltd.; Conductex SC, Raven 150, 50, 40, and 15, which are supplied by Columbian Carbon Co. The carbon black may be subjected to surface treatment with a dispersing agent, or the like, or may be grafted with a resin. It is also possible to employ a carbon black having been treated such that a portion of the carbon black surface may be graphitized. Further, before being added to a coating material for the formation of the magnetic layer, the carbon black may be dispersed in a binder. The carbon black materials described above may be used alone, or two or more of them may be used in combination.

In cases where the carbon black is contained in the magnetic layer, the proportion of the carbon black should preferably fall within the range of 0.1% by weight to 30% by weight with respect to the weight of the ferromagnetic particles. The carbon black has antistatic effects, friction coefficient reducing effects, light blocking property imparting effects, and film strength improving effects on the magnetic layer. These effects vary in accordance with the kind of the carbon black used. Therefore, in the magnetic recording medium in accordance with the present invention, the kind of the carbon black, the proportion of the carbon black, and the combination of different carbon black materials may be varied between the magnetic layer and the lower coating layer, and the carbon black having specific characteristics, such as the particle size, the oil absorption, the electric conductance, and the pH value, may be selected in accordance with the characteristics of the magnetic layer or the lower coating layer which is to be obtained. As for the carbon black which may be employed in the magnetic layer of the magnetic recording medium in accordance with the present invention, reference may be made to, for example, "Carbon Black Handbook," published by Carbon Black Society.

The magnetic layer may further contain abrasive particles. Examples of the materials for the abrasive particles include α-alumina having a degree of alphatization of at least 90%, β-alumina, silicon carbide, chromium oxide, cerium oxide, α-iron oxide, corundum, artificial diamond, silicon nitride, titanium carbide, titanium oxide, silicon dioxide, and boron nitride. Principally, one of the above-enumerated abrasive particle materials having a Mohs hardness of at least 6 may be used alone, or two or more of them may be used in combination. Also, a composite material obtained from the above-enumerated abrasive particle materials (i.e., a composite material obtained by treating the surfaces of abrasive particles with different abrasive particles) may be used. The abrasive particles may also contain compounds or elements other than the main constituent. In such cases, if the proportion of the main constituent is at least 90%, the same effects can be obtained as when the abrasive particles do not contain the other compounds or elements. The particle size of the abrasive particles should preferably fall within the range of 0.01 μm to 2 μm. When necessary, abrasive particles having a certain particle size and abrasive particles having a different particle size may be used in combination. Alternatively, in cases where abrasive particles having a certain particle size are employed, the particle diameter distribution of the abrasive particles may be set to be wide, and the same effects as those obtained by combining the abrasive particles having different particle sizes may thereby be obtained. The tap density of the abrasive particles should preferably fall within the range of 0.3 g/cc to 2 g/cc. The water content of the abrasive particles should preferably fall within the range of 0.1% by weight to 5% by weight. The pH value of the abrasive particles should preferably fall within the range of 2 to 11, and the specific surface area of the abrasive particles should preferably fall within the range of 1 m²/g to 30 m²/g. The abrasive particles may have an acicular shape, a spherical shape, or a dice-like shape. The abrasive particles having angles at portions of the shape have good polishing properties and are therefore preferable. Examples of the abrasive particles include AKP-20, AKP-30, AKP-50, HIT-50, HIT-60, HIT-60A, HIT-70A, HIT-80, HIT-80G, and HIT-100, which are supplied by Sumitomo Chemical Co., Ltd.; G5, G7, and S-1, which are supplied by Nippon Chemical Industrial Co., Ltd.; and TF-100, and TF-140, which are supplied by Toda Kogyo K.K. In the magnetic recording medium in accordance with the present invention, the kind of the abrasive particles, the proportion of the abrasive particles, and the combination of different abrasive particle materials may be varied between the magnetic layer and the lower coating layer in accordance with the characteristics of the magnetic layer or the lower coating layer which is to be obtained. The abrasive particles may firstly be dispersed in the binder and may thereafter be added to the magnetic coating composition. The number of the abrasive particles, which are located on the surface and the side faces of the magnetic layer of the magnetic recording medium in accordance with the present invention should preferably be at least 5 pieces/100 μm².

As the additives contained in the magnetic recording medium in accordance with the present invention, the additives having the lubricating effects, the antistatic effects, the dispersing effects, the plasticizing effects, or the like, are employed. Examples of the additives include molybdenum disulfide; tungsten disulfide; graphite; boron nitride; graphite fluoride; a silicone oil; a silicone having a polar group; a fatty acid-modified silicone; a fluorine-containing silicone; a fluorine-containing alcohol; a fluorine-containing ester; a polyolefin; a polyglycol; an alkylphosphoric ester and its alkali metal salt; an alkylsulfuric ester and its alkali metal salt; a polyphenyl ether; a fluorine-containing alkylsulfuric ester and its alkali metal salt; a monobasic fatty acid having 10 to 24 carbon atoms (which fatty acid may have an unsaturated bond or may be branched) and its metal salt (with Li, Na, K, Cu, or the like); a monohydric, dihydric, trihydric, tetrahydric, pentahydric, or hexahydric alcohol having 12 to 22 carbon atoms (which alcohol may have an unsaturated bond or may be branched); an alkoxy alcohol having 12 to 22 carbon atoms; a mono-fatty acid ester, a di-fatty acid ester, or a tri-fatty acid ester of a monobasic fatty acid having 10 to 24 carbon atoms (which fatty acid may have an unsaturated bond or may be branched) with a monohydric, dihydric, trihydric, tetrahydric, pentahydric, or hexahydric alcohol having 2 to 12 carbon atoms (which alcohol may have an unsaturated bond or may be branched); a fatty acid ester of a mono-alkyl ether of an alkylene oxide polymer; a fatty acid amide having 8 to 22 carbon atoms; and an aliphatic amine having 8 to 22 carbon atoms.

Specifically, examples of the additives include lauric acid, myristic acid, palmitic acid, stearic acid, behenic acid, butyl stearate, oleic acid, linolic acid, linolenic acid, elaidic acid, octyl stearate, amyl stearate, isooctyl stearate, octyl myristate, butoxyethyl stearate, anhydrosorbitan monostearate, anhydrosorbitan distearate, anhydrosorbitan tristearate, oleyl alcohol, and lauryl alcohol. It is also possible to use nonionic surface active agents, such as an alkylene oxide compound, a glycerin compound, a glycidol compound, and an adduct of an alkyl phenol with ethylene oxide; cationic surface active agents, such as a cyclic amine, an ester amide, a quaternary ammonium salt, a hydantoin derivative, a heterocyclic compound, a phosphonium compound, and a sulfonium compound; anionic surface active agents containing acidic groups, such as a carboxylic acid group, a sulfonic acid group, a phosphoric acid group, a sulfuric ester group, and a phosphoric ester group; and amphoteric surface active agents, such as an amino acid, an amino sulfonic acid, a sulfate or a phosphate of an amino alcohol, and an alkyl betaine compound. The above-enumerated surface active agents are described in, for example, "Surface Active Agent Handbook", Sangyo Tosho K.K. The lubricating agents, the antistatic agents, and the like, need not necessarily be perfectly pure and may contain impurities, such as isomers, unreacted materials, side reaction products, decomposition products, and oxides, besides the main constituents. The proportions of these impurities should preferably be at most 30%, and should more preferably be at most 10%.

When necessary, the kinds and the proportions of the lubricating agents, the surface active agents, and the like, may be varied between the intermediate layer and the magnetic layer. For example, fatty acids having different melting temperatures may be employed in the intermediate layer and the magnetic layer, and the bleeding to the surface of the magnetic recording medium may thereby be controlled. Alternatively, esters having different boiling temperatures or different levels of polarity may be employed in the intermediate layer and the magnetic layer, and the bleeding to the surface of the magnetic recording medium may thereby be controlled. As another alternative, the proportion of the surface active agent may be adjusted such that the stability of the coating may be enhanced. As a further alternative, the amount of the lubricating agent added to the intermediate layer may be set to be large, and the lubricating effects may thereby be enhanced.

The addition of the entire portion or a portion of each additive may be carried out at any stage of the process for producing the magnetic coating composition. For example, the additive may be mixed with the ferromagnetic particles before the kneading process is carried out. Alternatively, the additive may be added during the process for kneading the ferromagnetic particles, the binder, and the solvent together. As another alternative, the additive may be added during or after the dispersing process. As a further alternative, the additive may be added immediately before the application of the coating composition. Also, in accordance with the desired layer characteristics, after the composition for the formation of the magnetic layer is applied onto the lower coating layer, a portion or the entire portion of the additive may be applied with the simultaneous or sequential coating technique, and the desired layer characteristics may thereby be obtained. Further, after a calendering process is carried out, or after a slitting process is carried out, the lubricating agent may be coated on the surface of the magnetic layer.

The lubricants, which may be employed in the magnetic recording medium in accordance with the present invention, are available under the trade names of, for example, NAA-102, NAA-415, NAA-312, NAA-160, NAA-180, NAA-174, NAA-175, NAA-222, NAA-34, NAA-35, NAA-171, NAA-122, NAA-142, NAA-160, NAA-173K, Castor Oil-Hardened Fatty Acid, NAA-42, NAA-44, Cation SA, Cation MA, Cation AB, Cation BB, Nymeen L-201, Nymeen L-202, Nymeen S-202, Nonion E-208, Nonion P-208, Nonion S-207, Nonion K-204, Nonion NS-202, Nonion NS-210, Nonion HS-206, Nonion L-2, Nonion S-2, Nonion S-4, Nonion O-2, Nonion LP-20R, Nonion PP-40R, Nonion SP-60R, Nonion OP-80R, Nonion OP-85R, Nonion LT-221, Nonion ST-221, Nonion OT-221, Monogly MB, Nonion DS-60, Anon BF, Anon LG, Butyl Stearate, Butyl Laurate, and Erucic Acid, which are supplied by Nippon Oil & Fats Co., Ltd.; Oleic Acid, which is supplied by Kanto Kagaku K.K.; FAL-205 and FAL-123, which are supplied by Takemoto Yushi K.K.; Njlub LO, Njlub IPM, and Sansocizer E4030, which are supplied by New Japan Chemical Co., Ltd.; TA-3, KF-96, KF-96L, KF96H, KF410, KF420, KF965, KF54, KF50, KF56, KF907, KF851, X-22-819, X-22-822, KF905, KF700, KF393, KF-857, KF-860, KF-865, X-22-980, KF-101, KF-102, KF-103, X-22-3710, X-22-3715, KF-910, and KF-3935, which are supplied by Shin-Etsu Chemical Co., Ltd.; Armid P, Armid C, and Armoslip CP, which are supplied by Lion Akzo Co., Ltd.; Duomin TDO, which is supplied by Lion Corp.; BA-41G, which is supplied by The Nisshin Oil Mills, Ltd.; Profan 2012E, Newpol PE61, Ionet MS-400, Ionet MO-200, Ionet DL-200, Ionet DS-300, Ionet DS-1000, and Ionet DO-200, which are supplied by Sanyo Chemical Industries Ltd.

Organic solvents may be used in any proportion in the magnetic recording medium in accordance with the present invention. Examples of the organic solvents include ketones, such as acetone, methyl ethyl ketone, methyl isobutyl ketone, diisobutyl ketone, cyclohexanone, and isophorone; alcohols, such as methyl alcohol, ethyl alcohol, propyl alcohol, butyl alcohol, isobutyl alcohol, isopropyl alcohol, and methylcyclohexanol; esters, such as methyl acetate, butyl acetate, isobutyl acetate, isopropyl acetate, ethyl lactate, and glycol acetate; glycol ethers, such as tetrahydrofuran, ethylene glycol dimethyl ether, ethylene glycol monoethyl ether, and dioxane; aromatic hydrocarbons, such as benzene, toluene, xylene, cresol, and chlorobenzene; chlorinated hydrocarbons, such as methylene chloride, ethylene chloride, carbon tetrachloride, chloroform, ethylene chlorohydrin, and dichlorobenzene; N,N-dimethylformamide; and hexane. The organic solvents need not necessarily be perfectly pure and may contain impurities, such as isomers, unreacted materials, side reaction products, decomposition products, oxides, and water, besides the main constituents. The proportions of these impurities should preferably be at most 30%, and should more preferably be at most 10%.

The same kind of organic solvent should preferably be employed in the magnetic layer and the intermediate layer of the magnetic recording medium in accordance with the present invention. However, the proportions of the organic solvent may be varied between the magnetic layer and the intermediate layer. A solvent (such as cyclohexane or dioxane) having a high surface tension should preferably be employed in the intermediate layer such that the stability of the coating may be enhanced. Specifically, it is important that the arithmetic mean value of the solvent composition employed in the magnetic layer is not smaller than the arithmetic mean value of the solvent composition employed in the lower coating layer. In order for the dispersion properties to be enhanced, the polarity of the solvent should preferably be comparatively high. A solvent having a permittivity falling within the range of 15 to 20 should preferably be contained in the solvent composition and in a proportion of at least 50% by weight. The solubility parameter should preferably fall within the range of 8 to 11.

The thickness of the non-magnetic substrate of the magnetic recording medium in accordance with the present invention may fall within the range of 1 μm to 100 μm. In particular, good effects can be obtained when the thickness of the non-magnetic substrate is as thin as 1 μm to 8 μm.

The total thickness of the magnetic layer and the lower coating layer may be 1/100 to 2 times as thick as the thickness of the non-magnetic substrate. An adhesive layer may be formed between the non-magnetic substrate and the lower coating layer such that the adhesion between them may be enhanced.

The thickness of the adhesive layer may fall within the range of 0.1 μm to 2 μm, and should preferably fall within the range of 0.02 μm to 0.5 μm. A back coating layer may be formed on the surface of the non-magnetic substrate on the side opposite to the magnetic layer. The thickness of the back coating layer may fall within the range of 0.1 μm to 2 μm, and should preferably fall within the range of 0.3 μm to 1.0 μm. As the materials for the adhesive layer and the back coating layer, any of known materials may be employed.

As a flexible substrate, it is preferred to use the non-magnetic substrate in accordance with the present invention. Any of known films having a micro Vickers hardness of at least 75 kg/mm$^2$ and having been subjected to biaxial orientation may be employed. Examples of the materials for the non-magnetic substrate include a polyethylene naphthalate, a polyamide, a polyimide, a polyamide-imide, an aromatic polyamide, and a polybenzoxazole. In particular, the non-magnetic substrate should preferably be constituted of an aramid resin or a polyethylene naphthalate.

The non-magnetic substrate may be subjected to corona discharge treatment, plasma treatment, adhesion facilitating treatment, heat treatment, dust-resistant treatment, or the like. In order for the objects of the present invention to be accomplished, the surface roughness Ra, expressed in terms of arithmetic mean deviation, of the surface of the non-magnetic substrate, on which surface the magnetic layer is to be formed, should fall within the range of 0.1 nm to 10 nm, should preferably fall within the range of 0.2 nm to 6 nm, and should more preferably fall within the range of 0.5 nm to 4 nm. Thus the value of the surface roughness Ra of the surface of the non-magnetic substrate should be small, and the non-magnetic substrate should preferably be free from coarse protrusions of 1 μm or larger. Also, the roughness form of the surface of the non-magnetic substrate can be controlled freely by the size and the amount of fillers, which are added to the non-magnetic substrate when necessary. Examples of the fillers include oxides and carbonates of Al, Ca, Si, and Ti, which may be crystalline or amorphous, and fine organic powder, such as an acrylic type of fine powder and a melamine type of fine powder. Further, such that the durability against the movement operation may be kept high, the roughness of the surface of the non-magnetic substrate, on which surface the back coating layer is formed, should preferably be rougher than the roughness of the surface of the non-magnetic substrate, on which surface the magnetic layer is formed. The surface roughness Ra of the surface of the non-magnetic substrate, on which surface the back coating layer is formed, should preferably be at least 1 nm, and should more preferably be at least 4 nm. In cases where the roughness of the surface of the non-magnetic substrate, on which surface the magnetic layer is formed, and the roughness of the surface of the non-magnetic substrate, on which surface the back coating layer is formed, are to be set to be different from each other, a substrate having a dual constitution may be employed, or a coating layer may be overlaid upon the substrate surface.

The F-5 value of the non-magnetic substrate along the direction of the tape movement (i.e., along the longitudinal direction of the tape) should preferably fall within the range of 10 kg/mm$^2$ to 50 kg/mm$^2$, and the F-5 value of the non-magnetic substrate along the width direction of the tape should preferably fall within the range of 10 kg/mm$^2$ to 30 kg/mm$^2$. Ordinarily, the F-5 value of the non-magnetic substrate along the longitudinal direction of the tape is set to be larger than the F-5 value of the non-magnetic substrate along the width direction of the tape. However, in cases where it is necessary for the strength of the non-magnetic substrate along the width direction of the tape to be set to be particularly large, the F-5 value of the non-magnetic substrate along the width direction of the tape may be set to be larger than the F-5 value of the non-magnetic substrate along the longitudinal direction of the tape. The degree of heat shrinkage, at 100° C.×30 min, of the non-magnetic substrate along each of the direction of the tape movement and the width direction of the tape should preferably be at most 3%, and should more preferably be at most 1.5%. Also, the degree of heat shrinkage, at 80° C.×30 min, of the non-magnetic substrate along each of the direction of the tape movement and the width direction of the tape should preferably be at most 1%, and should more preferably be at most 0.5%. The breaking strength of the non-magnetic substrate along each of the direction of the tape movement and the width direction of the tape should preferably fall within the range of 5 kg/mm$^2$ to 100kg/mm. The modulus of elasticity of the non-magnetic substrate should preferably fall within the range of 100 kg/mm$^2$ to 2,000kg/mm$^2$. The light transmittance with respect to light having a wavelength of 900nm should preferably be at most 30%, and should more preferably be at most 3%.

The process for producing the magnetic coating compositions for the magnetic recording medium in accordance with the present invention comprises at least a kneading process, a dispersing process, and mixing processes, which may be carried, when necessary, before and after the kneading process and the dispersing process. Each of the processes maybe carried out in two or more steps. The addition of each of the raw materials, such as the ferromagnetic particles, the binder, the carbon black, the abrasive particles, the antistatic agent, the lubricating agent, and the solvent, may be carried out at the initial stage or the intermediate stage of an arbitrary process. Also, the entire amount of each of the raw materials may be divided into two or more portions, and the two or more portions of the raw material may be added in two or more different processes. For example, the entire amount of a polyurethane may be divided into three portions, and the three portions of the polyurethane may be added respectively in the kneading process, the dispersing process, and the mixing process which is carried out for adjusting the viscosity of the coating composition after the dispersing process. In order to accomplish the objects of the present invention, a conventional production technique may be utilized at part of each process In the kneading process, a kneader having a strong kneading power, such as a continuous kneader or a pressure kneader, should preferably be utilized. In such cases, the magnetic recording medium in accordance with the present invention, which has a high remanent magnetic flux density Br, can be obtained. For example, in cases where the continuous kneader or the pressure kneader is utilized, the ferromagnetic particles and the entire amount of the binder or a portion of the binder (preferably, at least 30% of the entire amount of the binder) in proportions falling within the range of 15 to 500 parts per 100 parts of the ferromagnetic particles are subjected to the kneading process. The kneading techniques are described in detail in, for example, U.S. Pat. No. 5,300,244 and Japanese Unexamined Patent Publication No. 1(1989)-166338. In cases where the non-magnetic coating composition for forming the lower coating layer is prepared, a dispersing medium having a high specific gravity should preferably be utilized. As the dispersing medium, zirconia beads are preferable.

By way of example, as the apparatus and the method for forming the magnetic recording medium having the dual-layer constitution in accordance with the present invention, one of the techniques described below may be employed. (1) The lower coating layer is firstly applied onto the substrate by using a gravure coater, a roll coater, a blade coater, or an extrusion coater, which is ordinarily employed for the application of a magnetic coating composition. While the lower coating layer is being wet, the magnetic layer is applied onto the lower coating layer by using one of substrate press types of extrusion coaters, which are disclosed in, for example, U.S. Pat. Nos. 4,480,583; 4,681,062; and 5,302,206. (2) The lower coating layer and the magnetic layer are applied approximately simultaneously by using a single coating head, which has two coating composition passing slits and is disclosed in, for example, U.S. Pat. Nos. 4,854,262; 5,072,688; and 5,302,206. (3) The lower coating layer and the magnetic layer are applied approximately simultaneously by using an extrusion coater provided with a back-up roll, which is disclosed in, for example, Japanese Unexamined Patent Publication No. 2(1990)-174965.

Such that the electromagnetic characteristics, or the like, of the magnetic recording medium may be prevented from becoming low due to agglomeration of the magnetic particles, shearing force should preferably be imparted to the coating composition, which is located in the coating head, with one of methods disclosed in, for example, U.S. Pat. No. 4,828,779 and Japanese Unexamined Patent Publication No. 1(1989)-236968. Also, as for the viscosity range of the coating composition, the viscosity range disclosed in, for example, U.S. Pat. No. 4,994,306 should be satisfied.

In order for the magnetic recording medium in accordance with the present invention to be obtained, it is necessary to carry out a strong orientating process. The orientating process should preferably be carried out by utilizing a solenoid having a magnetic force of at least 1,000 G and a cobalt magnet having a magnetic force of at least 2,000 G, which are located such that the same poles may stand facing each other. Such that the state of orientation of the ferromagnetic particles after being dried may become as good as possible, an appropriate drying process should preferably be carried out before the orientation process is carried out. It has been known that, in order for the recording at high densities to be achieved, regardless of whether the acicular particles or plate-like particles are employed, it is efficient to incline the easy axis of magnetization in the vertical direction. Such a technique may be combined with the orientating process.

Before the non-magnetic lower coating layer and the magnetic layer are formed with the simultaneous dual-layer coating technique, an adhesive layer containing a polymer as the main constituent should preferably be formed, or a known technique for enhancing the adhesion with corona discharge, UV irradiation, or EB irradiation should preferably be carried out.

When necessary, a calendering process may be carried out. As the calendering rolls, heat-resistant plastic rolls constituted of an epoxy resin, a polyimide resin, a polyamide resin, a polyimide-amide resin, or the like, may be employed. It is also possible to employ metal rolls. The calendering temperature should preferably fall within the range of 70° C. to 120° C., and should more preferably fall within the range of 80° C. to 100° C. The linear pressure should preferably fall within the range of 200 kg/cm to 500 kg/cm, and should preferably fall within the range of 300 kg/cm to 400 kg/cm.

The coefficient of friction of the magnetic layer surface and the opposite surface of the magnetic recording medium in accordance with the present invention with respect to SUS420J should preferably fall within the range of 0.1 to 0.5, and should more preferably fall within the range of 0.2 to 0.3. The surface resistivity should preferably fall within the range of $10^4$ to $10^{12}$ ohms/sq. The modulus at 0.5% elongation of the magnetic layer along each of the direction of the tape movement and the width direction of the tape should preferably fall within the range of 100 kg/mm$^2$ to 2,000 kg/mm$^2$. The breaking strength should preferably fall within the range of 1 kg/cm$^2$ to 30 kg/cm$^2$. The modulus of elasticity of the magnetic recording medium along each of the direction of the tape movement and the width direction of the tape should preferably fall within the range of 100 kg/mm$^2$ to 1,500 kg/mm$^2$. The residual elongation should preferably be at most 0.5%. The degree of heat shrinkage at every temperature not higher than 100° C. should preferably be at most 1%, should more preferably be at most 0.5%, should most preferably be at most 0.1%, and should ideally be 0%. The glass transition temperature (i.e., the temperature at which the loss modulus in dynamic visco-elasticity measurement carried out at 110 Hz is maximum) of the magnetic layer should preferably fall within the range of 50° C. to 120° C. The glass transition temperature of the lower coating layer should preferably fall within the range of 0° C. to 100° C. The loss tangent should preferably be at most 0.2. If the loss tangent is very large, an adhesion failure will occur. The proportion of the residual solvent contained in the magnetic layer should preferably be at most 100 mg/m$^2$, and should more preferably be at most 10 mg/m$^2$. The proportion of the residual solvent contained in the magnetic layer should preferably be lower than the proportion of the residual solvent contained in the lower coating layer. The void volume in each of the non-magnetic lower coating layer and the magnetic layer should preferably be at most 30% by volume, and should more preferably be at most 20% by volume. In order for a high output to be achieved, the void volume should preferably be small. However, depending upon the characteristics which the magnetic recording medium should have, it often occurs that a certain level of void volume should be ensured. For example, as for magnetic recording media for recording magnetic information, which are to be repeatedly used many times, the void volume should ordinarily be set at a certain large level such that the durability against the movement operation may be kept high.

As for the magnetic characteristics of the magnetic recording medium in accordance with the present invention, the coercive force Hc along the direction of the tape movement, as measured with VSM under a magnetic field of 10 kOe, should preferably fall within the range of 2,000 Oe to 3,000 Oe, and should more preferably fall within the range of 2,100 Oe to 2,500 Oe. Also, the squareness ratio should preferably be at least 0.75. The squareness ratio should more preferably be at least 0.80, and should most preferably be at least 0.85. The squareness ratio along the two directions, which are normal to the direction of the tape movement, should preferably be at most 80% of the squareness ratio along the direction of the tape movement. The SFD of the magnetic layer should preferably be at most 0.6, should more preferably be at most 0.5, and should ideally be 0.

The surface roughness Ra, expressed in terms of arithmetic mean deviation, of the magnetic layer generally fall within the range of 1 nm to 10 nm. However, the value of the surface roughness Ra of the magnetic layer should be set appropriately in accordance with the characteristics of the magnetic layer which is to be obtained. In order for the electromagnetic characteristics to be kept good, the value of the surface roughness Ra should preferably be in the range not more than 5 nm. In order for the durability against the movement operation to be kept high, the value of the surface roughness Ra should preferably be as large as possible. Such that the requirements with respect to the surface roughness of the magnetic layer and the durability of the magnetic recording medium against the movement operation may be satisfied, it is necessary to carry out, for example, the adjustment of the amount of lubricating agents, the improvement of the physical properties of the magnetic layer (e.g. the improvement of the glass transition temperature Tg), and the like. In the present invention, the surface roughness Ra, expressed in terms of arithmetic mean deviation, which is determined with a light interference method, should fall within the range of 1 nm to 3 nm.

The magnetic recording medium in accordance with the present invention comprises the lower coating layer and the magnetic layer. It will be understood easily that the physical characteristics may be varied for the different layers in accordance with the characteristics of the magnetic recording medium which is to be obtained. For example, the modulus of elasticity of the magnetic layer may be set to be high such that the durability against movement can be enhanced, and the modulus of elasticity of the lower coating layer may be set to be lower than the modulus of elasticity of the magnetic layer such that the state of contact of the magnetic recording medium with the magnetic head can be kept good. Also, the state of contact with the magnetic head can be improved by altering the tensilizing method for the substrate. In cases where the substrate is tensilized in the direction, which is normal to the longitudinal direction of the tape, a good state of contact with the magnetic head can ordinarily be obtained.

EXAMPLES

The present invention will further be illustrated by the following nonlimitative examples. In these examples, the term "parts" means parts by weight.

Examples 1 to 15, and Comparative Examples 1 to 17

[Coating composition for a (non-magnetic) lower coating layer: Examples 1 to 10, Comparative Examples 1 to 12]

| Non-magnetic particles | 80 parts |
| --- | --- |

($\alpha$-$Fe_2O_3$, i.e. $\alpha$-hematite)
Longer axis length: Tables 1 to 5
Specific surface area (BET method): Tables 1 to 5
pH: Tables 1 to 5
Tap density: 0.8
Amount of $Al_2O_3$, $SiO_2$ and P: Tables 1 to 5

| Carbon black | 20 parts |
| --- | --- |

Mean primary particle diameter: 16 m$\mu$
DBP oil absorption: 80ml/100 g
pH: 8.0
Specific surface area (BET method): 250 $m^2$/g
Volatile content: 1.5%

| Vinyl chloride copolymer | 12 parts |
| --- | --- |

MR-104 supplied by Nippon Zeon Co., Ltd.

| Polyester polyurethane resin | 5 parts |
| --- | --- |

Neopentyl glycol/caprolactone polyol/MDI =0.9/2.6/1
Content of —$SO_3Na$ group: $1\times10^{-4}$eq/g

| $\alpha$-$Al_2O_3$ | 1 part |
| --- | --- |

Mean particle diameter: 0.2 $\mu$m

| Butyl stearate | 1 part |
| --- | --- |
| Stearic acid | 1 part |
| Methyl ethyl ketone | 100 parts |
| Cyclohexanone | 50 parts |
| Toluene | 50 parts |

[Coating composition for a (non-magnetic) lower coating layer: Examples 11 to 15, Comparative Examples 13 to 17]

| Non-magnetic particles | 80 parts |
| --- | --- |

($TiO_2$, i.e. titanium oxide)
Mean primary particle diameter: Tables 6 to 8
Specific surface area (BET method): Tables 6 to 8
pH: Tables 6 to 8
Tap density: 0.8
Amount of $Al_2O_3$, and $SiO_2$

| Carbon black | 20 parts |
| --- | --- |

Mean primary particle diameter: 16 m$\mu$g
DBP oil absorption: 80 ml/100 g
pH: 8.0
Specific surface area (BET method): 250 $m^2$/g
Volatile content: 1.5%

| Vinyl chloride copolymer | 12 parts |
| --- | --- |

MR-104 supplied by Nippon Zeon Co., Ltd.

| Polyester polyurethane resin | 5 parts |
| --- | --- |

Neopentyl glycol/caprolactone polyol/MDI =0.9/2.6/1
Content of —SO$_3$Na group: $1 \times 10^{-4}$eq/g

| α-Al$_2$O$_3$ | 1 part |
|---|---|

Mean particle diameter: 0.2 μm

| Butyl stearate | 1 part |
|---|---|
| Stearic acid | 1 part |
| Methyl ethyl ketone | 100 parts |
| Cyclohexanone | 50 parts |
| Toluene | 50 parts |

[Coating composition for a magnetic layer]

| Fine ferromagnetic metal particles | 100 parts |
|---|---|

(Fe-Co alloy)
Longer axis length: 0.085 μ
Anti-sintering agent: Y/Al
Coercive force Hc: 2,250 Oe
Saturation magnetization σS; 140 emu/g

| Polyester polyurethane resin | 12 parts |
|---|---|
| α-Al$_2$O$_3$ | 5 parts |

Mean particle diameter: 0.15 μm

| Carbon black | 0.5 part |
|---|---|

Mean particle diameter: 0.08 μm

| Butyl stearate | 1 part |
|---|---|
| Stearic acid | 5 parts |
| Methyl ethyl ketone | 90 parts |
| Cyclohexanone | 30 parts |
| Toluene | 60 parts |

As for each of the coating composition for the lower coating layer and the coating composition for the magnetic layer, the constituents were kneaded together by using an open kneader and were then subjected to a dispersing process in which a sand mill was used. As for the coating composition for the lower coating layer, 5 parts of a polyisocyanate (Coronate L, supplied by Nippon Polyurethane K.K.) were added to the resulting dispersion. Also, as for the coating composition for the magnetic layer, 5 parts of the polyisocyanate (Coronate L, supplied by Nippon Polyurethane K.K.) were added to the resulting dispersion. Thereafter, 40 parts of a methyl ethyl ketone-cyclohexanone mixed solvent were added to each of the coating composition for the lower coating layer and the coating composition for the magnetic layer. Each coating composition was then subjected to a filtrating process with a filter having a mean pore diameter of 1 μm. In this manner, the coating composition for forming the lower coating layer and the coating composition for forming the magnetic layer were prepared.

Thereafter, the coating composition for forming the lower coating layer and the coating composition for forming the magnetic layer were applied onto a polyethylene naphthalate substrate by using a simultaneous dual-layer coating technique. Specifically, thickness of the polyethylene naphthalate substrate was 5.5 μm, and the surface roughness Ra, expressed in terms of arithmetic mean deviation, of the substrate surface, on which the magnetic layer was to be formed, was equal to 0.002 μm. Also, the coating composition for forming the lower coating layer was applied onto the substrate and at a rate such that the dry thickness of the lower coating layer might fall within the range of 0.9 μ to 1.5 μ. Immediately after the coating composition for forming the lower coating layer was applied onto the substrate, the coating composition for forming the magnetic layer was applied onto the coating composition for forming the lower coating layer and at a rate such that the dry thickness of the magnetic layer might be equal to the value listed in Table 2 shown below. While the two layers were being wet, they were subjected to an orientating process, in which a cobalt magnet having a magnetic force of 4,000 G and a solenoid having a magnetic force of 4,000 G were used. The two layers were then dried and subjected to a calendering process, in which a seven-stage calendering equipment constituted of metal rolls alone was used. The calendering process was carried out at a temperature of 90° C. and at a speed of 200 m/min. Thereafter, a back coating layer having a thickness of 0.5 μm was formed on the substrate surface on the side of the substrate opposite to the magnetic layer. The thus obtained magnetic recording medium web was slit into a width of 8 mm, and a sample of an 8 mm video tape was thereby prepared.

The particle size of the α-iron oxide (α-hematite) particles contained in the lower coating layer was set at various different values, and various tape samples were thereby prepared. With the tape samples, the results shown in Table 1 below were obtained. As will be clear from Table 1, in cases where the particle size is set to be small, the radio-frequency (RF) output can be enhanced, but the kinetic friction coefficient becomes large due to the storage at a temperature of 60° C. and a relative humidity of 90% for seven days. However, as in Comparative Example 6, in cases where the particle size is set to be very small, the dispersion of the particles becomes difficult to carry out, and the surface smoothness of the magnetic layer becomes bad.

Table 2 shows the results obtained with the tape samples, which were prepared by setting the pH value of the α-iron oxide (α-hematite) particles, which were contained in the lower coating layer, at various different values and by altering the thickness of the magnetic layer. As will be clear from Table 2, in cases where the pH value of the α-iron oxide particles takes a value falling on the alkaline side, the kinetic friction coefficient (i.e., the μ value) does not become large after the storage at a temperature of 60° C. and a relative humidity of 90% for seven days. As for the sample of Comparative Example 3, the kinetic friction coefficient became large after the storage at a temperature of 60° C. and a relative humidity of 90% for seven days. Observation of the protrusions on the surface of the magnetic layer with an interatomic force microscope (AFM) revealed that, as for the sample of Comparative Example 3, the number of protrusions increased by a factor of approximately 70 up to 1,021 pieces due to the storage. However, as for the samples, which showed no increase in the kinetic friction coefficient due to the storage, the number of protrusions did not become large due to the storage. As for the sample of Comparative Example 10, wherein the thickness of the magnetic layer was very large, the output became low due to self-demagnetization. Also, as for the sample of Comparative Example 11, wherein the thickness of the magnetic layer was very small, the amount of magnetization became small, and the output became low.

The proportion of $Al_2O_3$, which served as the surface treatment agent for the α-iron oxide (α-hematite) particles contained in the lower coating layer, was set at various different values, and various tape samples were thereby prepared. With the tape samples, the results shown in Table 3 below were obtained. As will be clear from Table 3, there is a certain range of the proportion of $Al_2O_3$ in which the kinetic friction coefficient after the storage and the output are well balanced. In cases where the proportion of $Al_2O_3$ was low, an increase in the kinetic friction coefficient occurred after the storage at a temperature of 60° C. and a relative humidity of 90% for seven days. In cases where the proportion of $Al_2O_3$ was higher than 4%, the dispersibility of the particles became low, the surface of the magnetic layer became rough, and the output became low.

The proportion of $SiO_2$, which served as the surface treatment agent for the α-iron oxide (α-hematite) particles contained in the lower coating layer, was set at various different values, and various tape samples were thereby prepared. With the tape samples, the results shown in Table 4 below were obtained. As will be clear from Table 4, as in the proportion of $Al_2O_3$, there is a certain range of the proportion of $SiO_2$, in which the kinetic friction coefficient after the storage and the output are well balanced. In cases where the proportion of $SiO_2$ was low, an increase in the kinetic friction coefficient occurred after the storage at a temperature of 60° C. and a relative humidity of 90% for seven days.

The proportions of the surface treatment agents $Al_2O_3$ and $SiO_2$ for the α-iron oxide (α-hematite) particles and the proportion of phosphorus of the dispersing agent, were set at various different values, and various tape samples were thereby prepared. With the tape samples, the results shown in Table 5 below were obtained. As will be clear from Table 5, in cases where the proportion of phosphorus is low, the output becomes high. However, a substantial increase in the kinetic friction coefficient did not occur after the storage at a temperature of 60° C. and a relative humidity of 90% for seven days.

In lieu of the α-iron oxide (α-hematite) particles, titanium oxide particles were employed as the non-magnetic inorganic particles contained in the lower coating layer. The particle size of the titanium oxide particles was set at various different values, and various tape samples were thereby prepared. With the tape samples, the results shown in Table 6 below were obtained. As will be clear from Table 6, in cases where the particle size is small, the output is enhanced. Also, in cases where the pH value of the particles was smaller than 7, an increase in the kinetic friction coefficient occurred.

The pH value of the titanium oxide particles was set at various different values, and various tape samples were thereby prepared. With the tape samples, the results shown in Table 7 below were obtained. As will be clear from Table 7, as in the cases of the α-iron oxide, in cases where the pH value of the titanium oxide particles takes a value falling on the alkaline side, the kinetic friction coefficient does not become large after the storage. As for the samples of Comparative Examples 15 and 17, the kinetic friction coefficient became large after the storage. Observation of the protrusions on the surface of the magnetic layer with an interatomic force microscope (AFM) revealed that, as for the samples of Comparative Examples 15 and 17, the number of protrusions increased markedly due to the storage.

The proportion of $Al_2O_3$, which served as the surface treatment agent for the titanium oxide particles contained in the lower coating layer, was set at various different values, and various tape samples were thereby prepared. With the tape samples, the results shown in Table 8 below were obtained. As will be clear from Table 8, in cases where the proportion of $Al_2O_3$ is lower than 6%, the dispersibility of the particles becomes low, the surface of the magnetic layer becomes rough, and the output becomes low.

TABLE 1

| Sample No | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|
| Particle size | | | | | | | |
| Longer axis length | 0.32 | 0.21 | 0.14 | 0.14 | 0.10 | 0.06 | 0.15 |
| Shorter axis length | 0.04 | 0.03 | 0.02 | 0.02 | 0.02 | 0.01 | 0.02 |
| Axial ratio | 8 | 7 | 7 | 7 | 5 | 6 | 7.5 |
| Specific surface area | 39 | 48 | 52 | 62 | 70 | 72 | 62 |
| pH of particles | 5.7 | 6.2 | 6.3 | 5.8 | 5.6 | 5.8 | 5.8 |
| Contents | | | | | | | |
| $SiO_2$ (wt %) | 0.6 | 0.6 | 0.6 | 0.6 | 0.5 | 0.5 | 0.6 |
| $Al_2O_3$ (wt %) | 0.2 | 0.2 | 0.2 | 0.2 | 0.2 | 0.2 | 1.3 |
| P (ppm) | 52 | 34 | 40 | 43 | 40 | 40 | 43 |
| Water-soluble Na (ppm) | 96 | 77 | 50 | 100 | 50 | 48 | 100 |
| Water-soluble Ca (ppm) | 5 | 6 | 8 | 4 | 6 | 7 | 4 |
| Magnetic layer of tape | | | | | | | |
| Surface roughness (nm) | 4.8 | 2.9 | 2.5 | 2.4 | 2.8 | 3.3 | 2.4 |
| Thickness of magnetic layer | 0.2 | 0.2 | 0.2 | 0.2 | 0.2 | 0.2 | 0.2 |
| RF output | −4.3 | −2.8 | −1.8 | −2.0 | −2.5 | −3.8 | −2.0 |
| Ratio of kinetic friction coeff. After storage/before storage | 92 | 176 | 184 | 140 | 154 | 92 | 140 |

TABLE 2

Characteristics by pH of α-Iron Oxide in Lower Coating Layer and Characteristics by Thickness of Magnetic Layer

| Sample No. | Comp. Ex. 3 | Ex. 1 | Ex. 2 | Comp. Ex. 10 | Ex. 9 | Ex. 10 | Comp. Ex. 11 |
|---|---|---|---|---|---|---|---|
| Particle size | | | | | | | |
| Longer axis length | 0.14 | 0.14 | 0.14 | 0.14 | 0.14 | 0.14 | 0.14 |
| Shorter axis length | 0.02 | 0.02 | 0.02 | 0.02 | 0.02 | 0.02 | 0.02 |
| Axial ratio | 7 | 7 | 7 | 7 | 7 | 7 | 7 |
| Specific surface area | 52 | 51 | 48 | 51 | 51 | 51 | 51 |
| pH of particles | 6.3 | 8.4 | 0.7 | 8.4 | 8.4 | 8.4 | 8.4 |
| Contents | | | | | | | |
| $SiO_2$ (wt %) | 0.6 | 1.5 | 0.6 | 1.5 | 1.5 | 1.5 | 1.5 |
| $Al_2O_3$ (wt %) | 0.2 | 2.3 | 1.2 | 2.3 | 2.3 | 2.3 | 2.3 |
| P (ppm) | 40 | 41 | 37 | 41 | 41 | 41 | 41 |
| Water-soluble Na (ppm) | 50 | 89 | 77 | 89 | 89 | 89 | 89 |
| Water-soluble Ca (ppm) | 8 | 1 | 0 | 1 | 1 | 1 | 1 |
| Magnetic layer of tape | | | | | | | |
| Surface roughness (nm) | 2.5 | 2.3 | 2.4 | 2.3 | 2.3 | 2.3 | 2.3 |
| Thickness of magnetic layer | 0.2 | 0.2 | 0.2 | 0.8 | 0.5 | 0.13 | 0.05 |
| RF output | −1.8 | −1.7 | −1.8 | −4.7 | −2.5 | −1.5 | −3.2 |
| Ratio of kinetic friction coeff. After storage/before storage | 185 | 110 | 105 | 105 | 105 | 110 | 110 |
| Number of small protrusions | | | | | | | |
| Before storage | 15 | 15 | 15 | 10 | 12 | 12 | 18 |
| After storage for 7 days | 1021 | 21 | 14 | 12 | 22 | 26 | 13 |

TABLE 3

| Sample No. | Comp. Ex. 8 | Example 2 | Example 3 | Example 4 | Comp. Ex. 9 |
|---|---|---|---|---|---|
| Particle size | | | | | |
| Longer axis length | 0.14 | 0.14 | 0.14 | 0.14 | 0.14 |
| Shorter axis length | 0.02 | 0.02 | 0.02 | 0.02 | 0.02 |
| Axial ratio | 7 | 7 | 7 | 7 | 7 |
| Specific surface area | 49 | 48 | 51 | 52 | 45 |
| pH of particles | 9.2 | 9.7 | 9.7 | 9.6 | 9.7 |
| Contents | | | | | |
| $SiO_2$ (wt %) | 0.6 | 0.5 | 0.6 | 0.5 | 0.6 |
| $Al_2O_3$ (wt %) | 0.4 | 1.2 | 1.8 | 3.4 | 4.5 |
| P (ppm) | 41 | 37 | 39 | 40 | 35 |
| Water-soluble Na (ppm) | 63 | 77 | 117 | 119 | 131 |
| Water-soluble Ca (ppm) | 0 | 0 | 0 | 0 | 0 |
| Magnetic layer of tape | | | | | |
| Surface roughness (nm) | 2.4 | 2.4 | 3.0 | 2.5 | 3.2 |
| Thickness of magnetic layer | 0.2 | 0.2 | 0.2 | 0.2 | 0.2 |
| RF output | −1.8 | −1.8 | −2.0 | −2.2 | −2.5 |
| Ratio of kinetic friction coeff. After storage/before storage | 149 | 105 | 105 | 94 | 98 |

TABLE 4

| Sample No. | Comp. Ex. 8 | Example 5 | Example 6 | Comp. Ex. 9 |
|---|---|---|---|---|
| Particle size | | | | |
| Longer axis length | 0.14 | 0.14 | 0.14 | 0.14 |
| Shorter axis length | 0.02 | 0.02 | 0.02 | 0.02 |
| Axial ratio | 7 | 7 | 7 | 7 |
| Specific surface area | 49 | 52 | 52 | 44 |
| pH of particles | 9.2 | 8.3 | 8.4 | 8.7 |
| Contents | | | | |
| $SiO_2$ (wt %) | 0.6 | 1.2 | 1.5 | 3.5 |
| $Al_2O_3$ (wt %) | 0.4 | 0.5 | 0.4 | 0.5 |
| P (ppm) | 41 | 40 | 40 | 51 |
| Water-soluble Na (ppm) | 63 | 95 | 89 | 70 |
| Water-soluble Ca (ppm) | 0 | 1 | 1 | 0 |
| Magnetic layer of tape | | | | |
| Surface roughness (nm) | 2.4 | 2.3 | 2.2 | 4.3 |
| Thickness of magnetic layer | 0.2 | 0.2 | 0.2 | 0.2 |
| RF output | −1.8 | −1.9 | −1.8 | −3.8 |
| Ratio of kinetic friction coeff. After storage/before storage | 149 | 110 | 110 | 95 |

TABLE 5

| Sample No. | Example 1 | Example 7 | Example 8 | Comp. Ex. 12 |
|---|---|---|---|---|
| Particle size | | | | |
| Longer axis length | 0.14 | 0.14 | 0.14 | 0.14 |
| Shorter axis length | 0.02 | 0.02 | 0.02 | 0.02 |
| Axial ratio | 7 | 7 | 7 | 7 |
| Specific surface area | 51 | 51 | 51 | 51 |
| pH of particles | 8.4 | 8.4 | 8.4 | 8.4 |
| Contents | | | | |
| $SiO_2$ (wt %) | 1.5 | 1.5 | 1.5 | 0.5 |
| $Al_2O_3$ (wt %) | 2.3 | 2.3 | 2.3 | 0.4 |
| P (ppm) | 41 | 5 | 0 | 0 |
| Water-soluble Na (ppm) | 89 | 70 | 40 | 72 |
| Water-soluble Ca (ppm) | 1 | 0 | 1 | 0 |
| Magnetic layer of tape | | | | |
| Surface roughness (nm) | 2.3 | 2.1 | 2.1 | 3.8 |
| Thickness of magnetic layer | 0.2 | 0.2 | 0.2 | 0.2 |
| RF output | −1.7 | −1.5 | −1.2 | −4.2 |
| Ratio of kinetic friction coeff. | | | | |
| After storage for 7 days/before storage | 110 | 105 | 95 | 95 |
| After storage for 21 days/before storage | 105 | 108 | 100 | 102 |
| Number of small protrusions | | | | |
| Before storage | 15 | 17 | 10 | 12 |
| After storage for 7 days | 22 | 15 | 12 | 12 |
| After storage for 21 days | 32 | 21 | 10 | 19 |

TABLE 6

Characteristics by Particle Size of Titanium Oxide in Lower Coating Layer

| Sample No. | Comp. Ex. 13 | Comp. Ex. 14 | Comp. Ex. 15 | Comp. Ex. 16 |
|---|---|---|---|---|
| Particle size | 0.04 | 0.03 | 0.02 | 0.02 |
| Specific surface area | 42 | 55 | 71 | 83 |
| pH of particles | 6.4 | 6.0 | 6.8 | 6.5 |
| Contents | | | | |
| $SiO_2$ (wt %) | 0.1 | 0.1 | 0.1 | 0.1 |
| $Al_2O_3$ (wt %) | 6.7 | 6.5 | 6.8 | 6.2 |
| water-soluble Na (ppm) | 25 | 32 | 45 | 78 |
| Water-soluble Ca (ppm) | 8 | 7 | 8 | 12 |
| Magnetic layer of tape | | | | |
| Surface roughness (nm) | 4.0 | 3.2 | 2.5 | 2.8 |
| Thickness of magnetic layer | 0.2 | 0.2 | 0.2 | 0.2 |
| RF output | −3.5 | −2.2 | −2.0 | −2.8 |
| Ratio of kinetic friction coeff. | 164 | 146 | 157 | 149 |
| After storage/before storage | | | | |

TABLE 7

Characteristics by pH of Titanium Oxide in Lower Coating Layer

| Sample No. | Comp. Ex. 15 | Comp. Ex. 17 | Example 11 | Example 12 |
|---|---|---|---|---|
| Particle size | 0.02 | 0.02 | 0.02 | 0.02 |
| Specific surface area | 71 | 69 | 70 | 70 |

TABLE 7-continued

Characteristics by pH of Titanium Oxide in Lower Coating Layer

| Sample No. | Comp. Ex. 15 | Comp. Ex. 17 | Example 11 | Example 12 |
|---|---|---|---|---|
| pH of particles | 6.8 | 7.8 | 8.6 | 9.8 |
| Contents | | | | |
| $SiO_2$ (wt %) | 0.1 | 0.1 | 0.1 | 0.1 |
| $Al_2O_3$ (wt %) | 6.8 | 6.6 | 6.2 | 6.4 |
| Water-soluble Na (ppm) | 45 | 57 | 60 | 89 |
| water-soluble Ca (ppm) | 8 | 1 | 1 | 1 |
| Magnetic layer of tape | | | | |
| Surface roughness (nm) | 2.5 | 2.6 | 2.8 | 2.6 |
| Thickness of magnetic layer | 0.2 | 0.2 | 0.2 | 0.2 |
| RF output | −2.0 | −2.2 | −2.3 | −2.2 |
| Ratio of kinetic friction coeff. | 157 | 110 | 105 | 100 |
| After storage/before storage | | | | |
| Number of small protrusions | | | | |
| Before storage | 12 | 20 | 18 | 18 |
| After storage for 7 days | 220 | 149 | 24 | 15 |
| After storage for 21 days | 845 | 170 | 22 | 26 |

TABLE 8

Characteristics by Proportion of $Al_2O_3$ serving as Surface Treatment Agent for Titanium Oxide Particles in Lower Coating Layer

| Sample No. | Comp. Ex. 15 | Example 13 | Example 14 | Example 15 |
|---|---|---|---|---|
| Particle size | 0.02 | 0.02 | 0.02 | 0.02 |
| Specific surface area | 65 | 70 | 63 | 68 |
| pH of particles | 8.2 | 8.6 | 8.8 | 9.0 |
| Contents | | | | |
| $SiO_2$ (wt %) | 0.1 | 0.1 | 0.1 | 0.1 |
| $Al_2O_3$ (wt %) | 4.0 | 6.2 | 8.2 | 10.2 |
| Water-soluble Na (ppm) | 20 | 60 | 45 | 60 |
| Water-soluble Ca (ppm) | 1 | 1 | 1 | 1 |
| Magnetic layer of tape | | | | |
| Surface roughness (nm) | 3.1 | 2.8 | 2.4 | 2.5 |
| Thickness of magnetic layer | 0.2 | 0.2 | 0.2 | 0.2 |
| RF output | −3.0 | −2.3 | −2.2 | −2.5 |
| Ratio of kinetic friction coeff. | 110 | 105 | 100 | 95 |
| After storage/before storage | | | | |

The measured values were obtained with the methods described below.

(Measurement of thicknesses of the magnetic layer)

The magnetic recording medium was cut to a thickness of approximately 0.1 μm along the longitudinal direction of the magnetic recording medium by using a diamond cutter. The cut piece of the magnetic recording medium was observed with a transmission type of electron microscope and at 30,000-power magnification, and the photograph of the cut piece was taken. The photograph print size was the A4 size. Thereafter, the interfaces among the substrate, the non-magnetic lower coating layer, and the magnetic layer were visually determined by paying particular attention to the difference between the shape of the non-magnetic inorganic particles contained in the lower coating layer and the shape of the ferromagnetic particles contained in the magnetic layer. The interfaces were bordered in black. Also, the surface of the magnetic layer was bordered in black. The distances between the border lines were measured by using an image processing apparatus (IBAS2, supplied by Zeiss Co.). The measurement was made with respect to a plurality of measurement points sampled over the range of a sample photograph length of 21 cm. The simple arithmetic mean value of the measured values was taken as the thickness of the magnetic layer.

(Specific surface area measured with the BET method)

The specific surface area was measured with Quantasorb (supplied by U.S. Quantachrome Co.). After dehydration was carried out in a nitrogen atmosphere at 250° C. for 30 minutes, the measurement was made with the BET single-point method (partial pressure: 0.30).

(Surface roughness Ra, expressed in terms of arithmetic mean deviation)

The surface roughness Ra of the surface of the medium was measured with the MIRAU method over an area of approximately 250 nm×250 nm by using TOPO3D (supplied by WYKO Co. The measurement wavelength was approximately 650 nm, and spherical surface compensation and cylinder compensation were carried out. The used device was the non-contact type of surface texture measuring instrument, in which the measurement was carried out with light interference.

(Particle diameters of ferromagnetic particles and non-magnetic inorganic particles)

The mean particle diameter was determined by using both of a method, wherein a photograph was taken with a transmission type of electron microscope, and wherein the shorter axis diameter and the longer axis diameter of the particles were directly read out from the photograph, and a method, wherein the shorter axis diameter and the longer axis diameter of the particles were read out by tracing the photograph, which was taken with the transmission type of electron microscope, with an image analyzing apparatus (IBASSI, supplied by Karl Zeiss Co.).

(Crystallite size of ferromagnetic particles)

As for they-iron oxide ferromagnetic particles, the crystallite size was determined with the diffraction X-ray method and from the spread of the half-width of the diffracted rays with respect to each of the (4, 4, 0) face and the (2, 2, 0) face. As for the metal ferromagnetic particles, the crystallite size was determined with the diffraction X-ray method and from the spread of the half-width of the diffracted rays with respect to each of the (1, 1, 0) face and the (2, 2, 0) face.

(Electromagnetic transducing characteristics) "Output of recording wavelengths of 0.488 $\mu$g and 22 $\mu$"

A reference ME tape in accordance with Fuji Photo Film Co., Ltd. was employed as reference. The output was measured with an outer contact type of drum tester and at a relative speed of 10.2 m/sec. The used magnetic head was an Fe head, and Bs was 1.5 T. The magnetic information was recorded with the optimum recording current, which is defined below.

The output of a recording wavelength of 0.488 $\mu$ should preferably be as high as possible. The output of a recording wavelength of 22 $\mu$ should preferably fall within the range of −2 dB to +2 dB.

(Optimum recording current)

The recording current larger by +4 dB than the recording current value, which is associated with a 90% output with respect to the maximum reproduction output in the input-output characteristic curve, is taken as the optimum recording current. The optimum recording current should preferably fall within the range of ±1.0 dB from the reference.

(Kinetic friction coefficient)

The kinetic friction coefficient was measured under the environmental conditions of a temperature of 23° C. and a relative humidity of 50% and by using a SUS420J sliding member.

(Proportions of elements)

The proportions of elements were measured by making an analysis of the ferromagnetic metal particle composition with the method described below.

(Analysis of ferromagnetic metal particle composition)

A 4N hydrochloric acid was added to 0.1 g of ferromagnetic metal particles (in cases where the composition of the ferromagnetic metal particles contained in the magnetic layer was to be determined, a piece of the magnetic layer equivalent to 0.1 g of the ferromagnetic metal particles). The ferromagnetic metal particles were dissolved in the 4 N hydrochloric acid, and 25 ml of a solution was thereby prepared. Thereafter, the solution was diluted to 1N. Such that the concentration might match with the concentration in a standard solution, the concentration was adjusted by dilution with a 1N hydrochloric acid solution. A sample solution was thereby obtained. The sample solution was then subjected to measurement with an ICP light emission analyzer (SPS1200A, supplied by Seiko Instruments Inc.), and the content of each element was determined. The ratio of the content of the element with respect to Fe was calculated in atom %. As the standard solution, a commercially available reagent for atomic absorption spectrometry (a metal standard solution) was used.

(Small protrusions)

The number of small protrusions was measured with an interatomic force microscope (AFM).

Rating device: Nanoscope III, supplied by Digital Instrument Co.

Rating conditions: Contact AFM mode, scanning speed 4 MHz

Sample: 200 $\mu$m angle

What is claimed is:

1. A magnetic recording medium comprising a flexible substrate having thereon, in order, a. a lower coating comprising a binder, inorganic particles and a fatty acid, wherein the inorganic particles have a pH value in the range from 7 to 11, and b. a magnetic layer comprising a binder and ferromagnetic metal particles, the magnetic layer having a thickness in a range from 0.05 to 0.5 $\mu$m, having protrusions with a height of at least 30 nm on the surface thereof, and having a surface roughness Ra, equal to or less than 3 nm wherein after the magnetic recording medium has been stored for seven days under environmental conditions of a temperature of 60° C. and a relative humidity of 90%, an increase in the number of protrusions having a height of at least 30 nm does not occur substantially on the surface of the magnetic layer.

2. A magnetic recording medium as defined in claim 1 wherein the inorganic particles contained in the lower coating layer are acicular or spindle-shaped $\alpha$-$Fe_2O_3$ particles having an average longer axis size in a range from 0.05 $\mu$m to 0.3 $\mu$m, an aspect ratio in a range from 2 to 20.

3. A magnetic recording medium as defined in claim 2 wherein the surfaces of the $\alpha$-$Fe_2O_3$ inorganic particles contain $SiO_2$ in a proportion falling within the range of 1.0% by weight to 2% by weight, $Al_2O_3$ in a proportion falling within the range of 1.0% by weight to 4% by weight, and P in a proportion of at most 50 ppm.

4. A magnetic recording medium as defined in claim 2 wherein the pH value of the $\alpha$-$Fe_2O_3$ particles is in the range from 9 to 10.

5. A magnetic recording medium as defined in claim 2 wherein the α-Fe$_2$O$_3$ particles have a tap density in a range from 0.05 g/ml to 2 g/ml, a water content in a range from 0.1% by weight to 5% by weight, and a specific surface area in a range from 1 m$^2$/g to 100 m$^2$/g.

6. A magnetic recording medium as defined in claim 2 wherein the α-Fe$_2$O$_3$ particles have a tap density in a range from 0.2 g/ml to 1.5 g/ml, a water content in a range from 0.3% by weight to 1.5% by weight, and a specific surface area in a range from 30 m$^2$/g to 80 m$^2$/g.

7. A magnetic recording medium as defined in claim 2 wherein the maximum magnetic flux density Bm of the magnetic layer, as measured under an external magnetic field of 10 kOe, is in the range of 3,700 gauss to 6,000 gauss, and a coercive force Hc of the magnetic layer is in the range of 2,000 Oe to 3,000 Oe.

8. A magnetic recording medium as defined in claim 7 wherein the ferromagnetic metal particles contain α-Fe as a main constituent and further contain at least one element selected from the group consisting of Al, Si, Ca, Y, Ba, La, Nd, Co, Ni, and B.

9. A magnetic recording medium as defined in claim 8 wherein the ferromagnetic metal particles has a specific surface area, as measured with the BET method, in a range from 45 m$^2$/g to 80 m$^2$/g, a crystallite size in a range from 80 angstrom to 350 angstrom, and a value of saturation magnetization σS in a range from 100 emu/g to 180 emu/g.

10. A magnetic recording medium as defined in claim 8, wherein said ferromagnetic metal particles have a pH value in a range from 6 to 10.

11. A magnetic recording medium as defined in claim 2 wherein the lower coating layer further contains carbon black.

12. A magnetic recording medium as defined in claim 11 wherein a specific surface area of the carbon black is in the range of 100 m$^2$/g to 500 m$^2$/g, an oil absorption amount, as measured with dibutyl phthalate, of the carbon black is in the range of 20 ml/100 g to 400 ml/100 g, and a proportion of the carbon black is at most 50% by weight with respect to the α-Fe$_2$O$_3$ particles.

13. A magnetic recording medium as defined in claim 2 wherein the fatty acid in the lower coating layer is selected from saturated or unsaturated, monobasic fatty acids having 12 to 24 carbon atoms and is contained in a proportion falling within a range from 0.3% by weight to 3% by weight with respect to the α-Fe$_2$O$_3$ particles.

14. A magnetic recording medium as defined in claim 2 wherein the magnetic layer further contains carbon black.

15. A magnetic recording medium as defined in claim 14 wherein carbon black is contained in a proportion falling within a range from 0.1% by weight to 30% by weight with respect to the ferromagnetic metal particles.

16. A magnetic recording medium as defined in claim 2 wherein at least either one of the lower coating layer and the magnetic layer further contains abrasive particles.

17. A magnetic recording medium as defined in claim 16 wherein the abrasive particles have a particle size in a range from 0.01 μm to 2 μm and are at least one kind of particles selected from the group consisting of α-alumina particles and chromium oxide particles.

18. A magnetic recording medium as defined in claim 2 wherein a backing layer is overlaid on a substrate surface opposite to the magnetic layer.

19. A magnetic recording medium as defined in claim 1 wherein the inorganic particles contained in the lower coating layer are titanium oxide particles, which have a specific surface area in a range from 50 m$^2$/g to 80 m$^2$/g and have a pH value in a range from 8 to 11.

20. A magnetic recording medium as defined in claim 19 wherein the surfaces of the titanium oxide inorganic particles contain Al$_2$O$_3$ in a proportion falling within the range of 6% by weight to 10% by weight.

21. A magnetic recording medium as defined in claim 1, wherein said magnetic layer has a thickness in a range from 0.07 to 0.2 μm.

22. A magnetic recording medium comprising a flexible substrate having thereon, in order,
a. a lower coating layer comprising a binder, inorganic particles having a pH in a range from 7 to 11 and a fatty acid, and
b. a magnetic layer having a thickness in a range from 0.05 to 0.5 μm and surface roughness Ra equal to or less than 3nm and comprising a binder and ferromagnetic metal particles, wherein a change in a kinetic friction coefficient of the surface of said magnetic layer before and after said magnetic recording medium has been stored for seven days under environmental condition of temperature of 60° C. and relative humidity of 90% is within a range of ±10%.

23. A magnetic recording medium as defined in claim 22 wherein the inorganic particles contained in the lower coating layer are acicular or spindle-shaped α-Fe$_2$O$_3$ particles having an average longer axis size in a range from 0.05 μm to 0.3 μm and an aspect ratio in a range from 2 to 20.

24. A magnetic recording medium as defined in claim 23 wherein the surfaces of the α-Fe$_2$O$_3$ inorganic particles contain SiO$_2$ in a proportion falling within the range of 1.0% by weight to 2% by weight, Al$_2$O$_3$ in a proportion falling within the range of 1.0% by weight to 4% by weight, and P in a proportion of at most 50 ppm.

25. A magnetic recording medium as defined in claim 23 wherein the pH value of the α-Fe$_2$O$_3$ particles is in the range from 9 to 10.

26. A magnetic recording medium as defined in claim 23 wherein the α-Fe$_2$O$_3$ particles have a tap density in a range from 0.05 g/ml to 2 g/ml, a water content in a range from 0.1% by weight to 5% by weight, and a specific surface area in a range from 1 m$^2$/g to 100 m$^2$/g.

27. A magnetic recording medium as defined in claim 23 wherein the α-Fe$_2$O$_3$ particles have a tap density in a range from 0.2 g/ml to 1.5 g/ml, a water content in a range from 0.3% by weight to 1.5% by weight, and a specific surface area in a range from 30 m$^2$/g to 80 m$^2$/g.

28. A magnetic recording medium as defined in claim 23 wherein the maximum magnetic flux density Bm of the magnetic layer, as measured under an external magnetic field of 10 kOe, is in the range of 3,700 gauss to 6,000 gauss, and a coercive force Hc of the magnetic layer is in the range of 2,000 Oe to 3,000 Oe.

29. A magnetic recording medium as defined in claim 28 wherein the ferromagnetic metal particles contain α-Fe as a main constituent and further contain at least one element selected from the group consisting of Al, Si, Ca, Y, Ba, La, Nd, Co, Ni, and B.

30. A magnetic recording medium as defined in claim 29 wherein the ferromagnetic metal particles has a specific surface area, as measured with the BET method, in a range from 45 m$^2$/g to 80 m$^2$/g, a crystallite size in a range from 80 angstrom to 350 angstrom, and a value of saturation magnetization σS in a range from 100 emu/g to 180 emu/g.

31. A magnetic recording medium as defined in claim 29, wherein said ferromagnetic metal particles have pH value in a range from 6 to 10.

32. A magnetic recording medium as defined in claim 23 wherein the lower coating layer further contains carbon black.

33. A magnetic recording medium as defined in claim 32 wherein a specific surface area of the carbon black is in the range of 100 m²/g to 500 m²/g, an oil absorption amount, as measured with dibutyl phthalate, of the carbon black is in the range of 20 ml/100 g to 400 ml/100 g, and a proportion of the carbon black is at most 50% by weight with respect to the α-Fe₂O₃ particles.

34. A magnetic recording medium as defined in claim 23 wherein fatty acid in the lower coating layer is selected from saturated or unsaturated, monobasic fatty acids having 12 to 24 carbon atoms and is contained in a proportion falling within a range from 0.3% by weight to 3% by weight with respect to the α-Fe₂O₃ particles.

35. A magnetic recording medium as defined in claim 23 wherein the magnetic layer further contains carbon black.

36. A magnetic recording medium as defined in claim 35 wherein carbon black is contained in a proportion falling within a range from 0.1% by weight to 30% by weight with respect to the ferromagnetic metal particles.

37. A magnetic recording medium as defined in claim 23 wherein at least either one of the lower coating layer and the magnetic layer further contains abrasive particles.

38. A magnetic recording medium as defined in claim 33 wherein the abrasive particles have a particle size in a range from 0.01 μm to 2 μm and are at least one kind of particles selected from the group consisting of α-alumina particles and chromium oxide particles.

39. A magnetic recording medium as defined in claim 23 wherein a backing layer is overlaid on a substrate surface opposite to the magnetic layer.

40. A magnetic recording medium as defined in claim 22 wherein the inorganic particles contained in the lower coating layer are titanium oxide particles, which have a specific surface area in a range from 50 m²/g to 80 m²/g and have a pH value in a range from 8 to 11.

41. A magnetic recording medium as defined in claim 40 wherein the surfaces of the titanium oxide inorganic particles contain Al₂O₃ in a proportion falling within the range of 6% by weight to 10% by weight.

42. A magnetic recording medium as defined in claim 22, wherein said magnetic layer has a thickness in a range from 0.07 μm to 0.2 μm.

43. A magnetic recording medium which comprises a flexible substrate having thereon, in order, a. a lower coating layer comprising a binder, inorganic particles comprising an acicular or spindle-shaped α-Fe₂O₃ powder having an average longer axis size in a range from 0.05 μm to 0.3 μm, an aspect ratio in a range from 2 to 20, and a fatty acid, and a pH value in a range from 7 to 11, wherein said α-Fe₂O₃ powder contains SiO₂ in a proportion within a range of 1.0% by weight to 2% by weight and Al₂O₃ in a proportion within a range of 1.0% by weight to 4% by weight; and b. a magnetic layer having a thickness in a range from 0.07 μm to 0.5 μm and surface roughness Ra equal to or less than 3 nm and comprising a binder and ferromagnetic metal particles.

44. A magnetic recording medium which comprises a flexible substrate having thereon, in order, a. a lower coating layer comprising a binder, inorganic particles comprising a titanium oxide powder having a specific surface area in a range from 50 m²/g to 80 m²/g, a pH value in a range from 8 to 11 and SiO₂ in a proportion within a range of 6% by weight to 10% by weight, and a fatty acid, and b. a magnetic layer having a thickness in a range from 0.05 μm to 0.5 μm and surface roughness Ra equal to or less than 3 nm and comprising a binder and ferromagnetic metal particles.

* * * * *

UNITED STATES PATENT AND TRADEMARK OFFICE
CERTIFICATE OF CORRECTION

PATENT NO.    : 5,908,683
DATED         : June 1, 1999
INVENTOR(S)   : Masaki Suzuki et al.

Page 1 of 1

It is certified that error appears in the above-identified patent and that said Letters Patent is hereby corrected as shown below:

Title page,
Item [73], before "Japan" insert -- Kanagawa-ken, --.

Column 1,
Item [30], delete "8-098864" and substitute -- 98864 -- in its place.

Claim 1,
Line 14, immediately after "C" delete "." (period).

Claim 7,
Line 4, delete "of3,700" and substitute -- of 3,700 -- in its place.

Claim 22,
Line 13, immediately after "C" delete "." (period).

Claim 38,
Line 1, delete "33" and substitute -- 37 -- in its place.

Signed and Sealed this

Twelfth Day of February, 2002

Attest:

Attesting Officer

JAMES E. ROGAN
Director of the United States Patent and Trademark Office